US009929844B2

United States Patent
Damnjanovic et al.

(10) Patent No.: US 9,929,844 B2
(45) Date of Patent: Mar. 27, 2018

(54) TECHNIQUES FOR TRANSMITTING PREAMBLES OVER AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Durga Prasad Malladi, San Diego, CA (US); Tao Luo, San Diego, CA (US); Yongbin Wei, La Jolla, CA (US); Peter Gaal, San Diego, CA (US); Wanshi Chen, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 173 days.

(21) Appl. No.: 14/866,428

(22) Filed: Sep. 25, 2015

(65) Prior Publication Data
US 2016/0142192 A1   May 19, 2016

Related U.S. Application Data

(60) Provisional application No. 62/081,480, filed on Nov. 18, 2014.

(51) Int. Cl.
*H04L 5/00* (2006.01)
*H04L 27/26* (2006.01)
(Continued)

(52) U.S. Cl.
CPC .......... *H04L 5/0053* (2013.01); *H04L 27/261* (2013.01); *H04W 74/0816* (2013.01); *H04W 16/14* (2013.01)

(58) Field of Classification Search
None
See application file for complete search history.

(56) References Cited

U.S. PATENT DOCUMENTS

| 9,113,483 B2 * | 8/2015 | Zou ....................... H04W 16/14 |
| 2016/0095110 A1 * | 3/2016 | Li ........................ H04W 72/1215 370/329 |
| 2016/0142920 A1 * | 5/2016 | Suzuki .................. H04W 16/14 370/336 |

FOREIGN PATENT DOCUMENTS

WO   WO-2012040520 A1   3/2012

OTHER PUBLICATIONS

Broadcom Corporation et al., "Robust Coexistence LAA-LTE," 3GPP TSG RAN WG1 Meeting #79, R1-145167, San Francisco, USA, Nov. 17-21, 2014, 9pgs., XP_50876190A, 3rd Generation Partnership Project.

(Continued)

*Primary Examiner* — Sulaiman Nooristany
(74) *Attorney, Agent, or Firm* — Dalei Dong; Holland & Hart LLP

(57) ABSTRACT

A device may determine that an unlicensed radio frequency (RF) spectrum band is available for a communication. The device may transmit a first transmission indicator that indicates that the device is transmitting information via the unlicensed RF spectrum band. The first transmission indicator may be associated with a first radio access technology. The device may transmit a second transmission indicator that indicates that the device is transmitting information via the unlicensed RF spectrum band. The second transmission indicator may be associated with a second radio access technology that is different from the first radio access technology.

13 Claims, 15 Drawing Sheets

(51) Int. Cl.
*H04W 74/08* (2009.01)
*H04W 16/14* (2009.01)

(56) References Cited

OTHER PUBLICATIONS

Etri, "Considerations on LAA Solution from Simulation Result," 3GPP TSG RAN WG1 Meeting #79, San Francisco, USA, R1-144920, Nov. 17-21, 2014, 6 pgs., XP_50875974A, 3rd Generation Partnership Project.
ISA/EPO, International Search Report and Written Opinion of the International Searching Authority, Int'l. App. No. PCT/US2015/052685, dated Mar. 24, 2016, European Patent Office, Rijswijk, NL, 20 pgs.
ISA/EPO, Partial International Search Report of the International Searching Authority, Int'l. App. No. PCT/US2015/052685, dated Dec. 9, 2015, European Patent Office, Rijswijk, NL, 7 pgs.
QUALCOMM Incorporated, "Solutions for Required Functionalities and Design Targets," 3GPP TSG RAN WG1 #78bis, R1-144000, Ljubljana, Slovenia, Oct. 6-10, 2014, 5pgs., 3rd Generation Partnership Project.
Ratasuk et al., "License-exempt LTE Deployment in Heterogeneous Network," 2012 International Symposium on Wireless Communication Systems (ISWCS), Paris, Aug. 28-31, 2012, pp. 246-250, ISBN 978-1-4673-0761-1, Institute of Electrical and Electronics Engineers.

\* cited by examiner

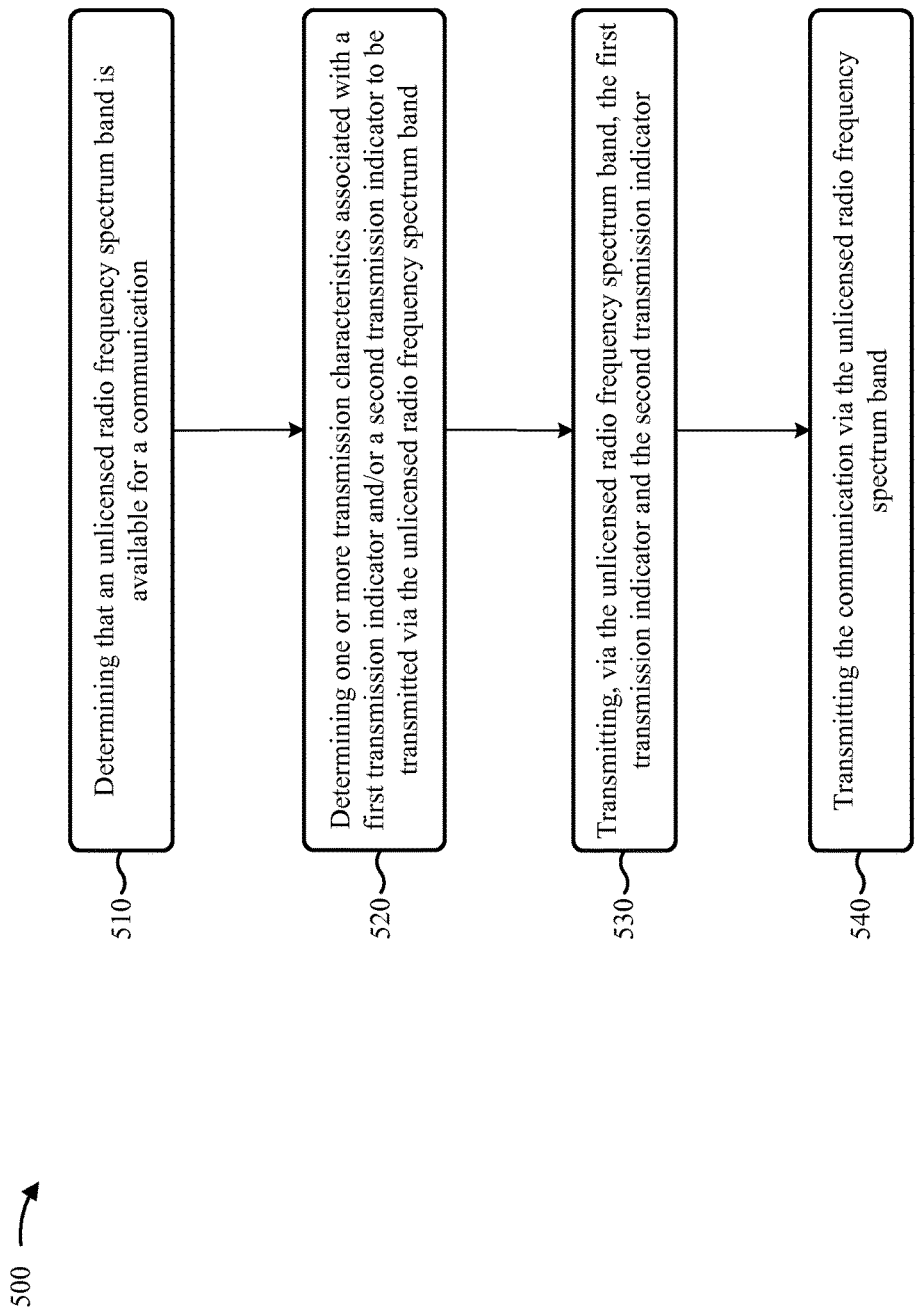

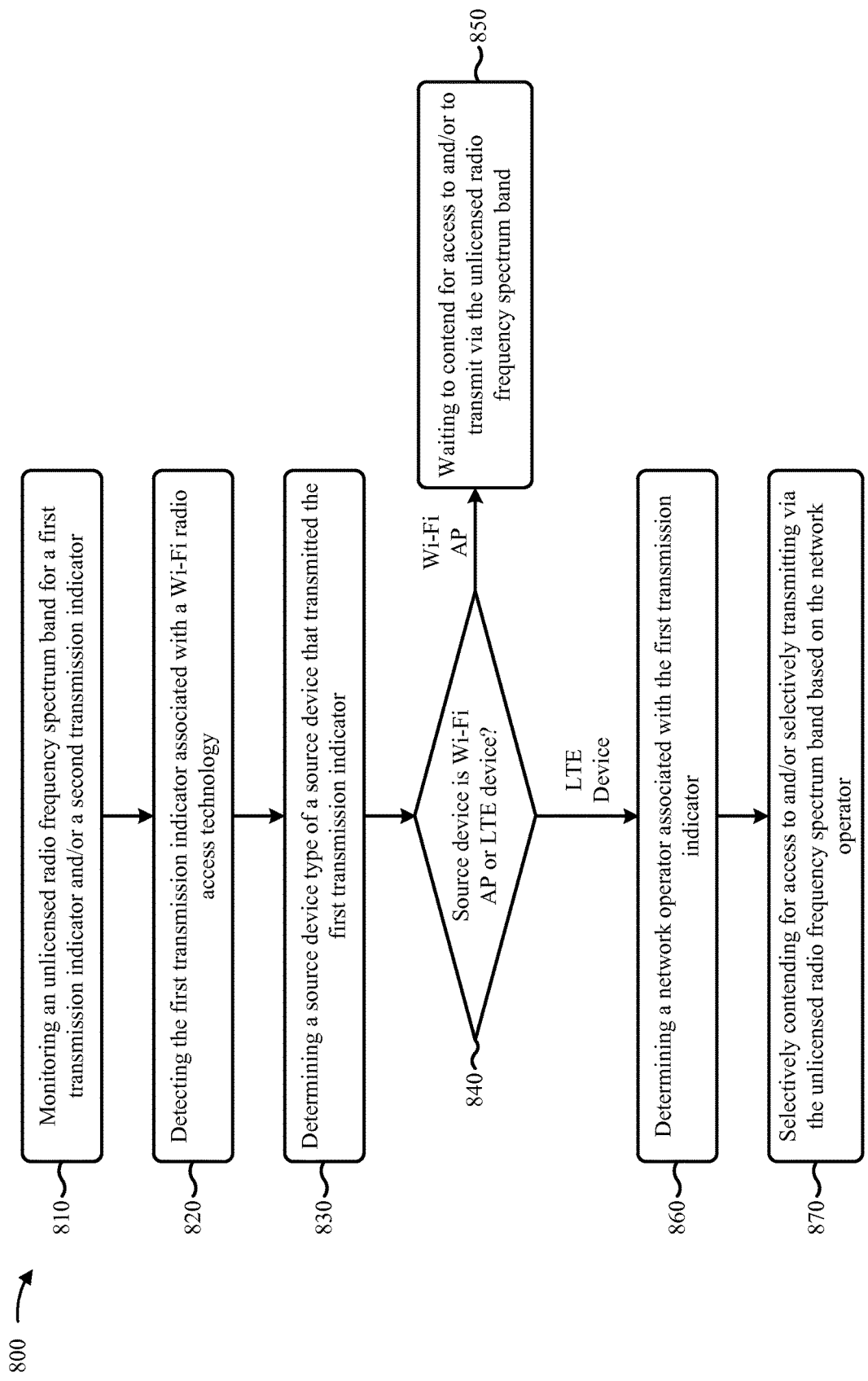

TECHNIQUES FOR TRANSMITTING PREAMBLES OVER AN UNLICENSED RADIO FREQUENCY SPECTRUM BAND

CROSS REFERENCES

The present application for patent claims priority to U.S. Provisional Patent Application No. 62/081,480 by Damnjanovic et al., entitled "Techniques for Transmitting Preambles Over an Unlicensed Radio Frequency Spectrum Band," filed Nov. 18, 2014, assigned to the assignee hereof, which is hereby incorporated by reference in its entirety.

BACKGROUND

Field of Disclosure

The present disclosure, for example, relates to wireless communication systems, and more particularly to techniques for transmitting preambles over an unlicensed radio frequency spectrum band.

Description of Related Art

Wireless devices may communicate over an unlicensed radio frequency (RF) spectrum band using one or more radio access technologies, such as a Wi-Fi radio access technology, a long term evolution radio access technology, or the like. An unlicensed RF spectrum band may refer to an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. In other words, devices that use the unlicensed RF spectrum band must typically accept any radio interference caused by other devices that use the unlicensed RF spectrum band.

SUMMARY

A device may determine that an unlicensed radio frequency (RF) spectrum band is available for a communication. The device may transmit a first transmission indicator that indicates that the device is transmitting information via the unlicensed RF spectrum band. The first transmission indicator may be associated with a first radio access technology. The device may transmit a second transmission indicator that indicates that the device is transmitting information via the unlicensed RF spectrum band. The second transmission indicator may be associated with a second radio access technology that is different from the first radio access technology.

In an example a method may include determining, by a device, that an unlicensed radio frequency spectrum band is available for a communication. The method may include transmitting, by the device and based on determining that the unlicensed radio frequency spectrum band is available for the communication, a first transmission indicator that indicates that the device is transmitting information via the unlicensed radio frequency spectrum band. The first transmission indicator may be associated with a first radio access technology. The method may include transmitting, by the device and based on determining that the unlicensed radio frequency spectrum band is available for the communication, a second transmission indicator that indicates that the device is transmitting information via the unlicensed radio frequency spectrum band. The second transmission indicator may be associated with a second radio access technology that is different from the first radio access technology.

In some examples of the method, transmitting the first transmission indicator may include transmitting the first transmission indicator via the unlicensed radio frequency spectrum band, and transmitting the second transmission indicator may include transmitting the second transmission indicator via the unlicensed radio frequency spectrum band. In some examples, the first transmission indicator may include a Wi-Fi preamble and the first radio access technology may include a Wi-Fi radio access technology. The second transmission indicator may include a channel usage beacon signal and the second radio access technology may include a long term evolution (LTE) radio access technology deployed in the unlicensed radio frequency spectrum band. In some examples of the method, transmitting the first transmission indicator and transmitting the second transmission indicator may comprise including the Wi-Fi preamble and the channel usage beacon symbol in a communication structure, where the Wi-Fi preamble may be included in a first field of the communication structure, and the channel usage beacon symbol may be included in a second field of the communication structure. In some examples, the first field may precede the second field. In some examples, transmitting the first transmission indicator and the second transmission indicator may include using the communication structure.

In some examples of the method, transmitting the first transmission indicator and transmitting the second transmission indicator may comprise including the Wi-Fi preamble and the channel usage beacon symbol in a communication structure, where the Wi-Fi preamble may be included in a first field of the communication structure, and the channel usage beacon symbol may be included in a second field of the communication structure. In some examples, the second field may precede the first field. In some examples, transmitting the first transmission indicator and the second transmission indicator may use the communication structure. In some examples of the method, transmitting the first transmission indicator and transmitting the second transmission indicator may comprise including the Wi-Fi preamble and the channel usage beacon symbol in a same field of a communication structure and transmitting the first transmission indicator and the second transmission indicator using the communication structure. In some examples, the first transmission indicator may be embedded within the second transmission indicator.

In some examples, determining that the unlicensed radio frequency spectrum band is available for the communication includes performing a clear channel assessment (CCA) procedure, and determining that the unlicensed radio frequency spectrum band is available for the communication based on performing the CCA procedure. In some examples, the device includes at least one of a base station or a user equipment. In some examples of the method, the first transmission indicator may include a Wi-Fi preamble, where the Wi-Fi preamble includes at least one of a source identifier that identifies the device, or a radio access technology indicator that indicates that the device is capable of transmitting signals using a long term evolution (LTE) radio access technology deployed in the unlicensed radio frequency spectrum band.

In some examples, the method may further include determining a Wi-Fi protocol associated with a Wi-Fi access point within a communication range of the device, and generating the first transmission indicator based on the Wi-Fi protocol. In some examples, the first transmission indicator may include a Wi-Fi preamble, where the Wi-Fi preamble may include a duration indicator that indicates a duration of the communication and the second transmission indicator may include an indication that the first transmission indicator was transmitted.

In an example a method may include detecting, by a device, a communication in an unlicensed radio frequency spectrum band. The communication may include a first transmission indicator associated with a first radio access technology. The device may use a second radio access technology to communicate via the unlicensed radio frequency spectrum band. The method may include determining, by the device and based on the first transmission indicator, a source device type of a source device that transmitted the communication in the unlicensed radio frequency spectrum band. The method may include selectively contending, by the device, for access to the unlicensed radio frequency spectrum band or selectively transmitting, by the device, via the unlicensed radio frequency spectrum band based on the source device type.

In some examples, the method may include determining that a first network operator associated with the source device is a different network operator than a second network operator associated with the device. Selectively contending for access to the unlicensed radio frequency spectrum band or selectively transmitting via the unlicensed radio frequency spectrum band based on the source type may include waiting an amount of time to contend for access to or transmit via the unlicensed radio frequency spectrum band based at least in part on the determination that the first network operator is the different network operator than the second network operator. In some examples, the method may include determining that a first network operator associated with the source device is a same network operator as a second network operator associated with the device. Selectively contending for access to the unlicensed radio frequency spectrum band or selectively transmitting via the unlicensed radio frequency spectrum band based on the source type may include contending for access to or transmitting via the unlicensed radio frequency spectrum band, without waiting an amount of time to contend for access to or transmit via the unlicensed radio frequency spectrum band, based at least in part on the determination that the first network operator is the same network operator as the second network operator.

In some examples of the method, the device may include at least one of a base station or a user equipment. Selectively contending for access to the unlicensed radio frequency spectrum band or selectively transmitting via the unlicensed radio frequency spectrum band may include waiting to contend for access to the unlicensed radio frequency spectrum band or waiting to transmit via the unlicensed radio frequency spectrum band for an amount of time when the source device type indicates that the source device is a Wi-Fi access point. In some examples, the method may include detecting a duration indicator included in the first transmission indicator, the duration indicator indicating an amount of time of the communication in the unlicensed radio frequency spectrum band. Selectively contending for access to the unlicensed radio frequency spectrum band or selectively transmitting via the unlicensed radio frequency spectrum band may include waiting to contend for access to the unlicensed radio frequency spectrum band or waiting to transmit via the unlicensed radio frequency spectrum band for the amount of time indicated by the duration indicator. In some examples, selectively contending for access to the unlicensed radio frequency spectrum band or selectively transmitting via the unlicensed radio frequency spectrum band may include contending for access to the unlicensed radio frequency spectrum band or transmitting via the unlicensed radio frequency spectrum band when the source device type indicates that the source device is a type of device using a LTE radio access technology deployed in the unlicensed radio frequency spectrum band.

In some examples, the method may include detecting a second transmission indicator associated with the second radio access technology, and determining the source device type may include determining that the source device type indicates that the source device is a type of device using a LTE radio access technology deployed in the unlicensed radio frequency spectrum band. The second transmission indicator may include an indication that the first transmission indicator is associated with the source device. In some examples determining the source device type may include determining that the source device type is the type of device using the LTE radio access technology deployed in the unlicensed radio frequency spectrum band based on the indication that the first transmission indicator is associated with the source device. The second transmission indicator may include a channel usage beacon symbol. In some examples, the second radio access technology is the LTE radio access technology deployed in the unlicensed radio frequency spectrum band.

In some examples, the method may include determining that an amount of time has passed, since detecting the first transmission indicator, without detecting a second transmission indicator associated with the second radio access technology, and where determining the source device type may include determining that the source device type indicates that the source device is a Wi-Fi access point based on determining that the amount of time has passed without detecting the second transmission indicator. In some examples, the method may include determining whether a second transmission indicator, associated with the first transmission indicator, indicates that the source device type is a type of device that uses long term evolution (LTE) radio access technology deployed in the unlicensed radio frequency spectrum band, and determining the source device type may include determining that the source device type is the type of device that uses the LTE radio access technology deployed in the unlicensed radio frequency spectrum band based on determining whether the second transmission indicator indicates that that the source device type is the type of device that uses the LTE radio access technology deployed in the unlicensed radio frequency spectrum band. In some examples, the first transmission indicator may include a Wi-Fi preamble.

In some examples of the method, selectively contending for access to the unlicensed radio frequency spectrum band or selectively transmitting via the unlicensed radio frequency spectrum band may include performing a CCA procedure to contend for access to the unlicensed radio frequency spectrum band when the source device type is a first source device type, or preventing the CCA procedure from being performed or waiting to perform the CCA procedure when the source device type is a second source device type. Selectively contending for access to the unlicensed radio frequency spectrum band or selectively transmitting via the unlicensed radio frequency spectrum band may include transmitting via the unlicensed radio frequency spectrum band when the source device type is a first source device type, or preventing transmission via the unlicensed radio frequency spectrum band or waiting to transmit via the unlicensed radio frequency spectrum band when the source device type is a second source device type.

In some examples, an apparatus may determine that an unlicensed radio frequency spectrum band is available for a communication. The device may transmit, based on determining that the unlicensed radio frequency spectrum band is available for the communication, a first transmission indicator that indicates that the device is transmitting information via the unlicensed radio frequency spectrum band. The first transmission indicator may be associated with a first radio access technology. The device may transmit, based on determining that the unlicensed radio frequency spectrum band is available for the communication, a second transmission indicator that indicates that the device is transmitting information via the unlicensed radio frequency spectrum band. The second transmission indicator may be associated with a second radio access technology that is different from the first radio access technology.

In some examples, an apparatus may detect a communication in an unlicensed radio frequency spectrum band. The communication may include a first transmission indicator associated with a first radio access technology. The device may use a second radio access technology to communicate via the unlicensed radio frequency spectrum band. The device may determine, based on the first transmission indicator, a source device type of a source device that transmitted the communication in the unlicensed radio frequency spectrum band. The device may selectively contend for access to the unlicensed radio frequency spectrum band or selectively transmit via the unlicensed radio frequency spectrum band based on the source device type.

In some examples, the apparatus may determine whether a first network operator associated with the source device is a same network operator as a second network operator associated with the apparatus, and where the apparatus may selectively contend for access to the unlicensed radio frequency spectrum band or selectively transmitting via the unlicensed radio frequency spectrum band based on the source type may include waiting an amount of time to contend for access to or transmit via the unlicensed radio frequency spectrum band based at least in part on a determination that the first network operator is not the same network operator as the second network operator, or contending for access to or transmit via the unlicensed radio frequency spectrum band, without waiting the amount of time, based at least in part on the determination that the first network operator is the same network operator as the second network operator.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a flow diagram of an example process for transmitting a first transmission indicator and a second transmission indicator via an unlicensed RF spectrum band, in accordance with various aspects of the present disclosure;

FIG. 8 is a flow diagram of an example process for selectively contending for access to and/or selectively transmitting via the unlicensed RF spectrum band based on a detected transmission indicator, in accordance with various aspects of the present disclosure;

DETAILED DESCRIPTION

Figure 1:
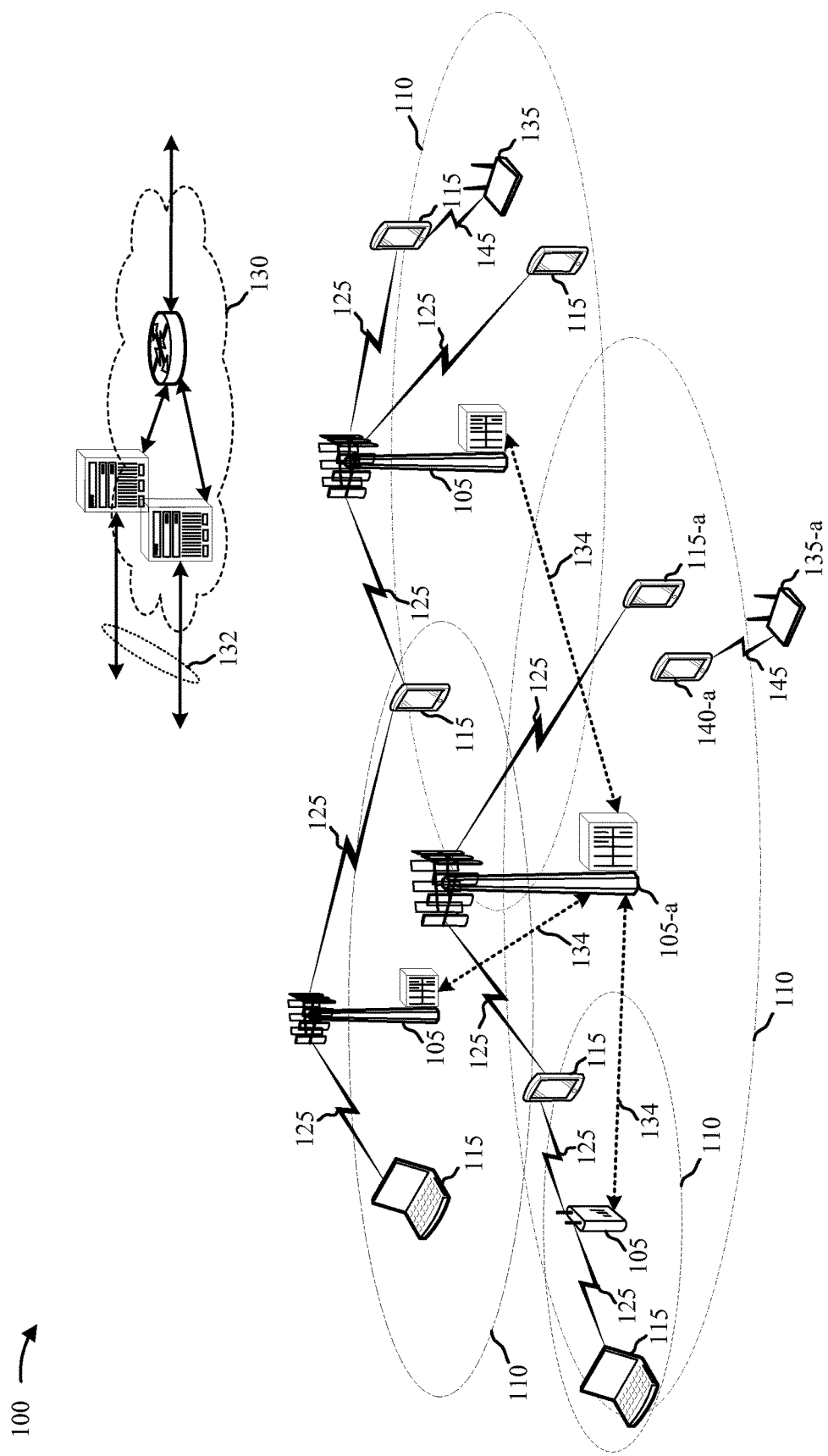
FIG. 1 is an illustration of an example wireless communication system, in accordance with various aspects of the present disclosure.

Techniques are described in which an unlicensed radio frequency (RF) spectrum band is used for at least a portion of communications over a wireless communication system. In some examples, the unlicensed RF spectrum band may be used by the base stations and user equipments (UEs) of a cellular network for Long Term Evolution (LTE) communications and/or LTE-Advanced (LTE-A) communications, and by Wi-Fi access points and Wi-Fi stations of a Wi-Fi network for Wi-Fi communications. The unlicensed RF spectrum band may be used by the cellular network in combination with, or independent from, a licensed RF spectrum band. In some examples, the unlicensed RF spectrum band may be a RF spectrum band for which a device may need to contend for access because the RF spectrum band is available, at least in part, for unlicensed use, such as Wi-Fi use.

Prior to gaining access to, and communicating over, an unlicensed RF spectrum band, a base station or UE may perform a listen before talk (LBT) procedure to contend for access to the unlicensed RF spectrum band. An LBT procedure may include performing a clear channel assessment (CCA) procedure to determine whether a channel of the unlicensed RF spectrum band is available. When it is determined that the channel of the unlicensed RF spectrum band is not available (e.g., because another apparatus is already using the channel of the unlicensed RF spectrum band), a CCA procedure may be performed for the channel again at a later time. In environments in which a base station or UE may be starved of access to a channel of an unlicensed RF spectrum band due to Wi-Fi activity, an extended CCA procedure may be employed to increase the likelihood that the base station or UE will successfully contend for access to the channel of the unlicensed RF spectrum band. An extended CCA procedure involves the performance of a random number of CCA procedures (from 1 to q), in accordance with an extended CCA counter. Regardless of whether a single CCA procedure or plurality of CCA procedures is performed, each CCA procedure may include detecting an energy level on the channel of the unlicensed RF spectrum band and determining whether the energy level is below a threshold. When the energy level is below the threshold, the CCA procedure is successful and contention to access the channel of the unlicensed RF spectrum band may be successful. When the energy level exceeds the threshold, the CCA procedure is unsuccessful and contention to access the channel of the unlicensed RF spectrum band may be unsuccessful.

When a CCA procedure or extended CCA procedure is successful, a transmission may be made over the channel of the unlicensed RF spectrum band. When a packet error is encountered (e.g., due to a collision of transmissions made by two or more transmitting apparatuses, or due to poor channel conditions), a hybrid automatic repeat request (HARQ)-based retransmission may be performed. In some examples, the retransmission may be modified from the original transmission using rate adaptation (e.g., based at least in part on a channel quality indicator (CQI) reported by a UE).

Prior to gaining access to, and communicating over, an unlicensed RF spectrum band, a Wi-Fi access point or Wi-Fi station may perform a carrier sense multiple access (CSMA) procedure in which the Wi-Fi access point or Wi-Fi station both 1) detects an energy level on the channel of the unlicensed RF spectrum band and determines whether the energy level is below a threshold, and 2) listens for transmissions of Wi-Fi preambles over the channel of the unlicensed RF spectrum band. The energy level at which Wi-Fi preambles are detected may be lower, and in some examples much lower, than the threshold to which the energy level on the channel of the unlicensed RF spectrum band is compared. When the energy level is below the threshold and the Wi-Fi node (e.g., the Wi-Fi access point or the Wi-Fi station) does not detect the transmission of a Wi-Fi preamble, the Wi-Fi node may access the channel of the unlicensed RF spectrum band. When the energy level exceeds the threshold, or when the Wi-Fi node detects the transmission of a Wi-Fi preamble, the Wi-Fi node may start a backoff counter based on a contention window size, and may refrain from accessing the channel of the unlicensed RF spectrum band until the backoff counter has expired. Each time that the Wi-Fi node determines that the energy level exceeds the threshold, detects a transmission of a Wi-Fi preamble, and/or receives a non-acknowledgement (NACK) from a Wi-Fi node to which a transmission was made, the Wi-Fi node may increase (e.g., double) the size of the contention window, to reduce the probability of a data collision or interference during a next transmission to or from the Wi-Fi node. In the case of Medium Access Control (MAC) protocol data unit (MPDU) aggregation, the contention window size may increase when all of the MPDUs are wrongly decoded by a receiving apparatus. The size of the contention window may be decreased (e.g., reset to a smallest size) upon the Wi-Fi node successfully gaining access to the channel of the unlicensed RF spectrum band. With respect to a Wi-Fi node's receipt of a NACK, there is no mechanism for adjusting one or more parameters of a retransmission (e.g., based on a reported CQI).

The asymmetry between the channel access mechanisms and rate adaptation mechanisms used by cellular nodes and Wi-Fi nodes may result in one or more Wi-Fi nodes being starved of access to a shared channel of an unlicensed RF spectrum band by one or more cellular nodes. As described herein, this Wi-Fi node starvation problem may be mitigated by inserting a channel occupancy identifier decodable by a Wi-Fi radio access technology (RAT) in a transmission over an unlicensed RF spectrum band using a cellular RAT.

FIG. 1 is an illustration of an example wireless communication system 100, in accordance with various aspects of the present disclosure. The wireless communication system 100 may include a cellular network and a Wi-Fi network. The cellular network may include one or more base stations 105, 105-a, one or more UEs 115, 115-a, and a core network 130. The Wi-Fi network may include one or more Wi-Fi access points 135, 135-a and one or more Wi-Fi stations 140, 140-a.

With reference to the cellular network of the wireless communication system 100, the core network 130 may provide user authentication, access authorization, tracking, Internet Protocol (IP) connectivity, and other access, routing, or mobility functions. The base stations 105, 105-a may interface with the core network 130 through backhaul links 132 (e.g., S1, etc.) and may perform radio configuration and scheduling for communication with the UEs 115, 115-a, or may operate under the control of a base station controller (not shown). In various examples, the base stations 105, 105-a may communicate, either directly or indirectly (e.g., through core network 130), with each other over backhaul links 134 (e.g., X2, etc.), which may be wired or wireless communication links.

The base stations 105, 105-a may wirelessly communicate with the UEs 115, 115-a via one or more base station antennas. Each of the base station 105, 105-a sites may provide communication coverage for a respective geographic coverage area 110. In some examples, a base station 105, 105-a may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-a may be divided into sectors making up a portion of the coverage area (not shown). The cellular network may include base stations 105, 105-a of different types (e.g., macro and/or small cell base stations). There may be geographic coverage areas 110 that overlap for different technologies.

In some examples, the cellular network may include an LTE/LTE-A network. In LTE/LTE-A networks, the term evolved Node B (eNB) may be used to describe the base stations 105, 105-a, while the term UE may be used to describe the UEs 115, 115-a. The cellular network may be a Heterogeneous LTE/LTE-A network in which different types of eNBs provide coverage for various geographical regions. For example, each eNB or base station 105, 105-a may provide communication coverage for a macro cell, a small cell, and/or other type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell, that may operate in the same or different (e.g., licensed, unlicensed, etc.) RF spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115, 115-a and the base stations 105, 105-a or core network 130 supporting radio bearers for the user plane data. At the Physical (PHY) layer, the transport channels may be mapped to Physical channels.

The UEs 115, 115-a may be dispersed throughout the wireless communication system 100, and each UE 115, 115-a may be stationary or mobile. A UE 115, 115-a may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-a may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-a and network equipment, including macro eNBs, small cell eNBs, relay base stations, and the like.

The communication links 125 shown in wireless communication system 100 may carry downlink (DL) transmissions from a base station 105, 105-a to a UE 115, 115-a, and/or uplink (UL) transmissions from a UE 115, 115-a to a base station 105, 105-a. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, 105-a and/or UEs 115, 115-a may include multiple antennas for employing antenna diversity schemes to improve communication quality and reliability between base stations 105, 105-a and UEs 115, 115-a. Additionally or alternatively, base stations 105, 105-a and/or UEs 115, 115-a may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-a may be configured with multiple downlink CCs and one or more uplink CCs for carrier aggregation. Carrier aggregation may be used with both FDD and TDD component carriers.

With reference to the Wi-Fi network of the wireless communication system 100, the Wi-Fi access points 135, 135-a may wirelessly communicate with the Wi-Fi stations 140, 140-a via one or more Wi-Fi access point antennas, over one or more communication links 145. In some examples, the Wi-Fi access points 135, 135-a may communicate with the Wi-Fi stations 140, 140-a using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a Wi-Fi station 140, 140-a may be a cellular phone, a personal digital assistant (PDA), a wireless communication device, a handheld device, a tablet computer, a laptop computer, or the like. In some examples, an apparatus may include aspects of both a UE 115, 115-a and a Wi-Fi station 140, 140-a, and such an apparatus may communicate with one or more base stations 105, 105-a using a first radio access technology (RAT) (e.g., a cellular RAT, or multiple cellular RATs), and communicate with one or more Wi-Fi access points 135, 135-a using a second RAT (e.g., a Wi-Fi RAT, or multiple Wi-Fi RATs).

In some examples, the base stations 105, 105-a and UEs 115, 115-a may communicate over a licensed RF spectrum band and/or an unlicensed RF spectrum band, whereas the Wi-Fi access points 135, 135-a and Wi-Fi stations 140, 140-a may communicate over the unlicensed RF spectrum band. The unlicensed RF spectrum band may therefore be shared by the base stations 105, 105-a, the UEs 115, 115-a, the Wi-Fi access points 135, 135-a, and/or the Wi-Fi stations 140, 140-a. Because the unlicensed RF spectrum band may be shared by apparatuses operating under different protocols (e.g., different RATs), transmitting apparatuses may contend for access to the unlicensed RF spectrum band.

As an example, the unlicensed RF spectrum band may include one or more radio frequencies (e.g., one or more RF spectrum bands) included in the radio spectrum (e.g., the portion of the electromagnetic spectrum corresponding to radio frequencies, or frequencies lower than approximately 300 gigahertz (GHz)). In some aspects, the unlicensed RF spectrum band may include one or more RF spectrum bands that are open for shared use by any device that complies with regulatory agency rules (e.g., associated with a country) for communicating via the one or more RF spectrum bands. For example, the unlicensed RF spectrum band may include one or more radio frequencies between approximately 5 GHz and approximately 6 GHz. As a more specific example, the unlicensed RF spectrum band may include one or more radio frequencies between approximately 5.15 GHz and approximately 5.825 GHz.

As another example, the unlicensed RF spectrum band may include one or more RF spectrum bands defined by the United States Federal Communications Commission (FCC) as the Unlicensed National Information Infrastructure (U-NII) radio band. The U-NII radio band may include, for example, a first RF spectrum band between approximately 5.15 GHz and approximately 5.25 GHz (e.g., the U-NII Low band), a second RF spectrum band between approximately 5.25 GHz and approximately 5.35 GHz (e.g., the U-NII Mid band), a third RF spectrum band between approximately 5.47 GHz and approximately 5.725 GHz (e.g., the U-NII Worldwide band), and/or a fourth RF spectrum band between approximately 5.725 GHz and approximately 5.825 GHz (e.g., the U-NII Upper band).

The unlicensed RF spectrum band may be divided into RF channels via which RF communications may be transmitted. For example, the unlicensed RF spectrum band may include one or more channels of approximately 20 MHz bandwidth. Wireless devices (e.g., UE 115, Wi-Fi access point 135, base station 105, etc.) may communicate via an RF channel included in the unlicensed RF spectrum band. For example, a wireless device may communicate via an RF channel using a Wi-Fi radio access technology, an LTE radio access technology, or the like. In some aspects, a wireless device may contend for access to the unlicensed RF spectrum band before sending a transmission via the unlicensed RF spectrum band, as described in more detail elsewhere herein.

Figure 2:
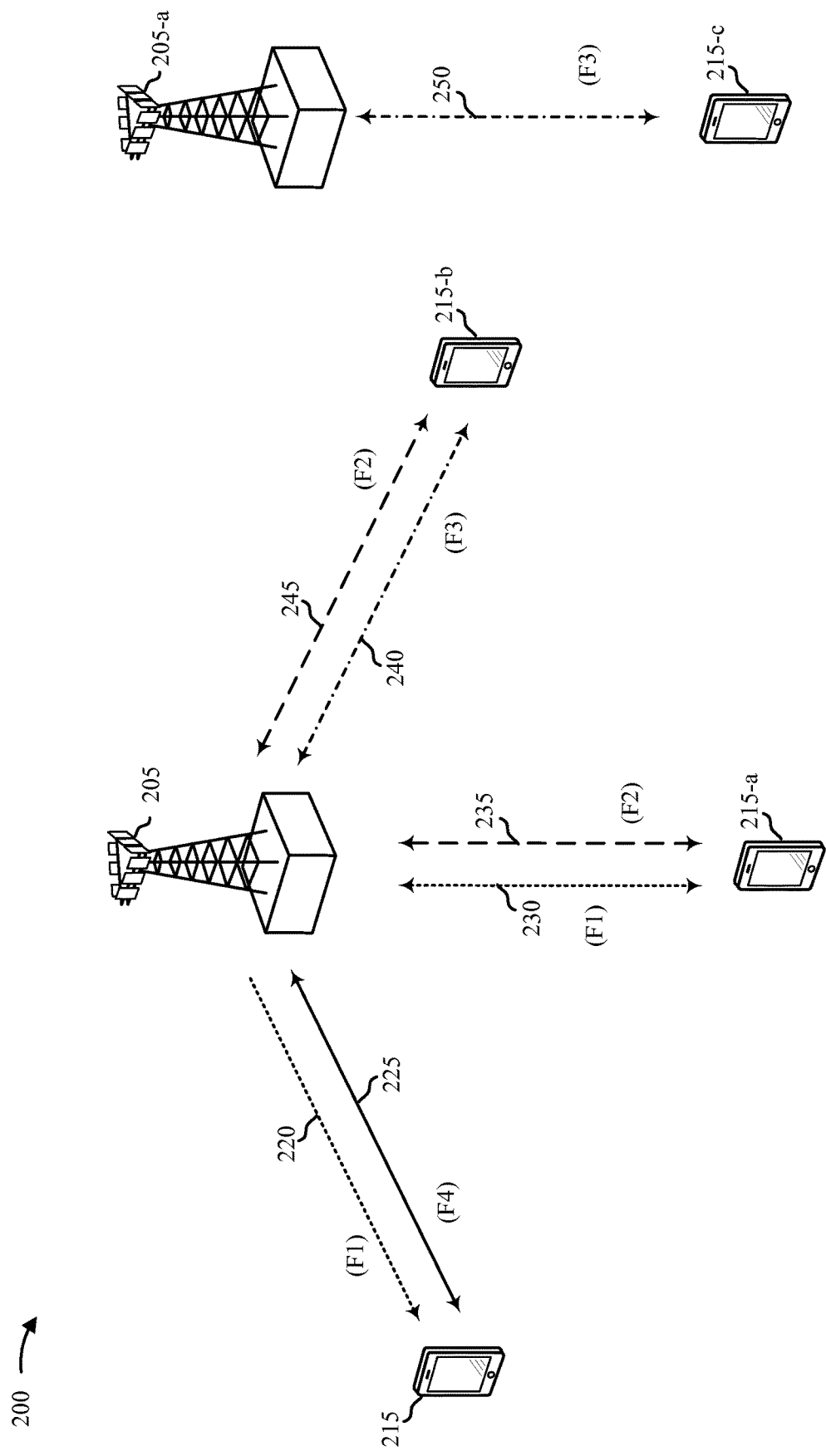
FIG. 2 is an illustration of an example wireless communication system in which long term evolution (LTE) and/or LTE-Advanced (LTE-A) may be deployed under different scenarios using an unlicensed radio frequency (RF) spectrum band, in accordance with various aspects of the present disclosure.

FIG. 2 is an illustration of an example wireless communication system 200 in which LTE and/or LTE-A may be deployed under different scenarios using an unlicensed RF spectrum band, in accordance with various aspects of the present disclosure. More specifically, FIG. 2 illustrates examples of a supplemental downlink mode (e.g., licensed assisted access mode), a carrier aggregation mode, and a standalone mode in which LTE/LTE-A is deployed using an unlicensed RF spectrum band. The wireless communication system 200 may be an example of portions of the wireless communication system 100 described with reference to FIG. 1. Moreover, a first base station 205 and a second base station 205-a may be examples of aspects of one or more of the base stations 105, 105-a described with reference to FIG. 1, while a first UE 215, a second UE 215-a, a third UE 215-b, and a fourth UE 215-c may be examples of aspects of one or more of the UEs 115, 115-a described with reference to FIG. 1.

In the example of a supplemental downlink mode (e.g., licensed assisted access) in the wireless communication system 200, the first base station 205 may transmit OFDMA waveforms to the first UE 215 using a downlink channel 220. The downlink channel 220 may be associated with a frequency F1 in an unlicensed RF spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed RF spectrum band. The downlink channel 220 in the unlicensed RF spectrum band and the first bidirectional link 225 in the licensed RF spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed RF spectrum band and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed RF spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed RF spectrum band. The second bidirectional link 230 may provide a downlink and uplink capacity offload for the first base station 205. Like the supplemental downlink mode (e.g., licensed assisted access mode) described above, this scenario may occur with any service provider (e.g., MNO) that uses a licensed RF spectrum band and needs to relieve some of the traffic and/or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the unlicensed RF spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed RF spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed RF spectrum band and use an unlicensed RF spectrum band for capacity offload.

As described above, one type of service provider that may benefit from the capacity offload offered by using LTE/LTE-A in an unlicensed RF spectrum band is a traditional MNO having access rights to an LTE/LTE-A licensed RF spectrum band. For these service providers, an operational example may include a bootstrapped mode (e.g., supplemental downlink (or licensed assisted access), carrier aggregation) that uses the LTE/LTE-A primary component carrier (PCC) on the licensed RF spectrum band and at least one secondary component carrier (SCC) on the unlicensed RF spectrum band.

In the carrier aggregation mode, data and control may, for example, be communicated in the licensed RF spectrum band (e.g., via first bidirectional link 225, third bidirectional link 235, and fifth bidirectional link 245) while data may, for example, be communicated in the unlicensed RF spectrum band (e.g., via second bidirectional link 230 and fourth bidirectional link 240). The carrier aggregation mechanisms supported when using an unlicensed RF spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-$a$ may transmit OFDMA waveforms to the fourth UE 215-$c$ using a bidirectional link 250 and may receive OFDMA waveforms, SC-FDMA waveforms, and/or resource block interleaved FDMA waveforms from the fourth UE 215-$c$ using the bidirectional link 250. The bidirectional link 250 may be associated with the frequency F3 in the unlicensed RF spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed RF spectrum band.

In some examples, a transmitting apparatus such as one of the base stations 105, 105-$a$, 205, and/or 205-$a$ described with reference to FIG. 1 and/or FIG. 2, and/or one of the UEs 115, 115-$a$, 215, 215-$a$, 215-$b$, and/or 215-$c$ described with reference to FIG. 1 and/or FIG. 2, may use a gating interval to gain access to a channel of an unlicensed RF spectrum band (e.g., to a physical channel of the unlicensed RF spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed RF spectrum band is available or in use for the gating interval (also referred to as an LBT radio frame). When a CCA procedure indicates that the channel is available for a corresponding LBT radio frame (e.g., "clear" for use), the transmitting apparatus may reserve and/or use the channel of the unlicensed RF spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
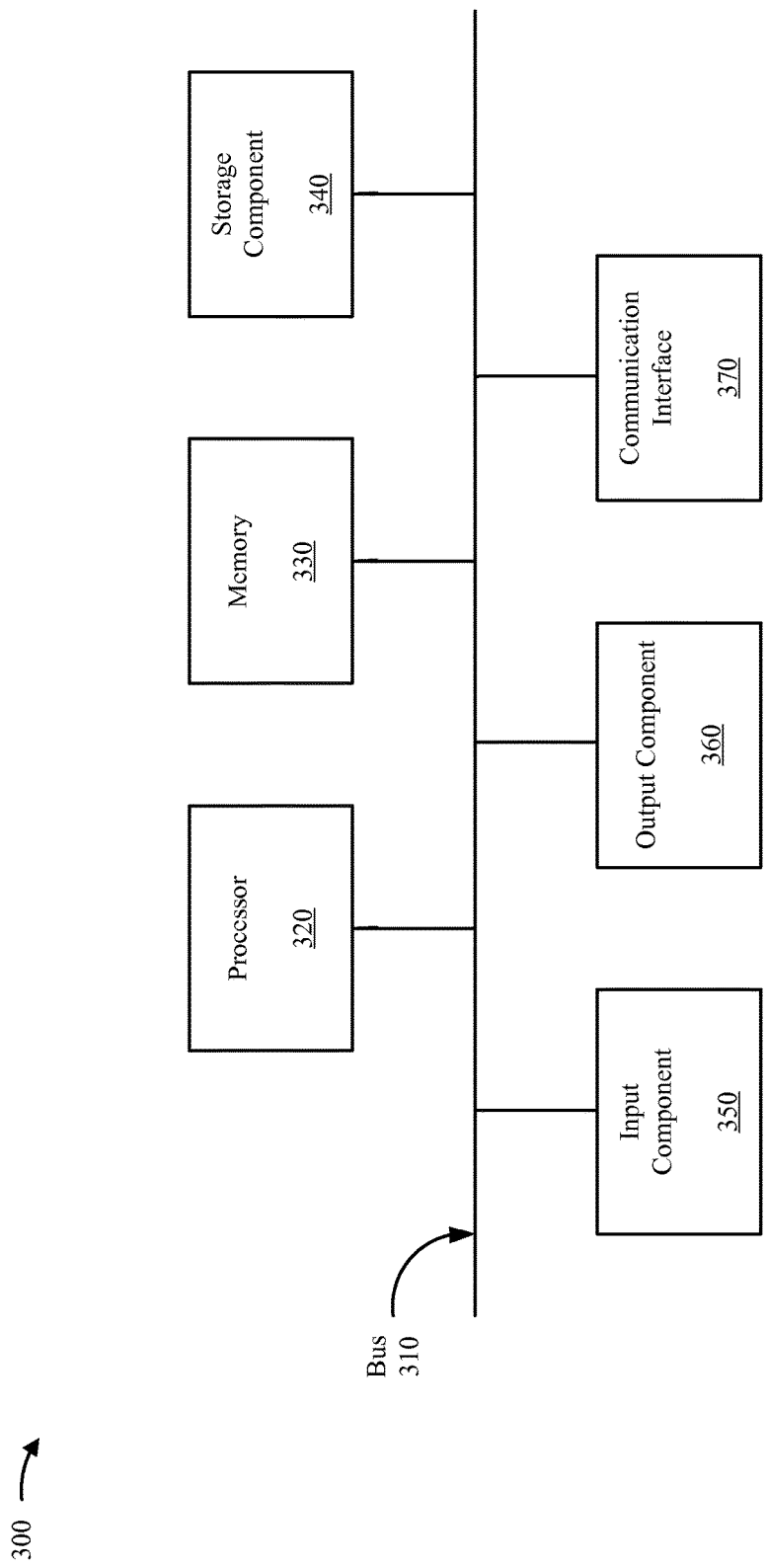
FIG. 3 is an illustration of example components of one or more devices of FIG. 1 and FIG. 2, in accordance with various aspects of the present disclosure.

FIG. 3 is an illustration of example components of one or more devices 300 of FIG. 1 and FIG. 2, in accordance with various aspects of the present disclosure. Device 300 may correspond to base station 105, UE 115, Wi-Fi access point 135, Wi-Fi station 140, base station 205, and/or UE 215. In some aspects, base station 105, UE 115, Wi-Fi access point 135, Wi-Fi station 140, base station 205, and/or UE 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processing component, such as a central processing unit (CPU), a graphics processing unit (GPU), an accelerated processing unit (APU), a microprocessor, a digital signal processor (DSP), a field-programmable gate array (FPGA), an application-specific integrated circuit (ASIC), and/or a similar type of processing component that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a RF interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
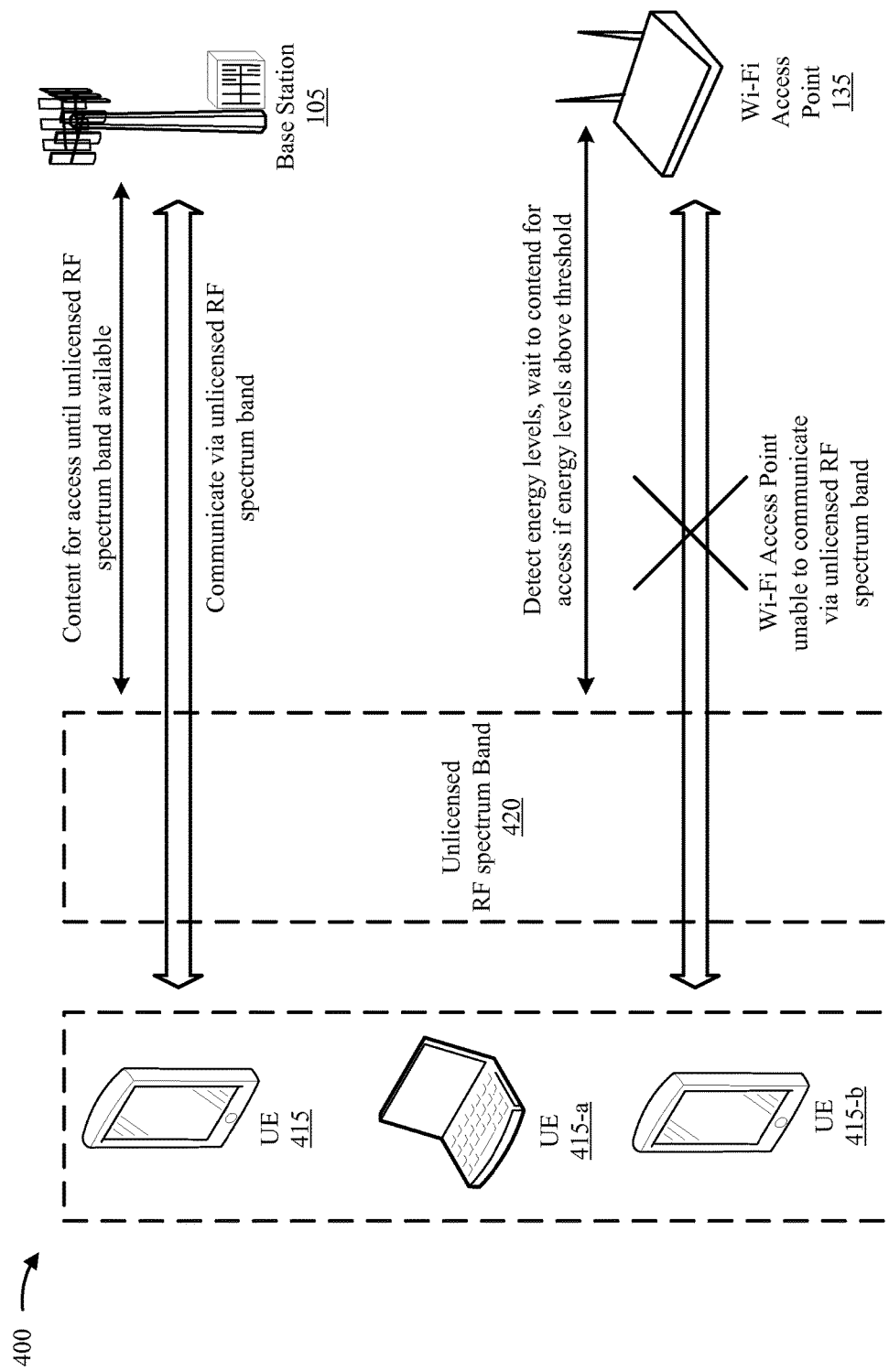
FIGS. 4A and 4B are illustrations of an overview of an example, in accordance with various aspects of the present disclosure.
Figure 4B:
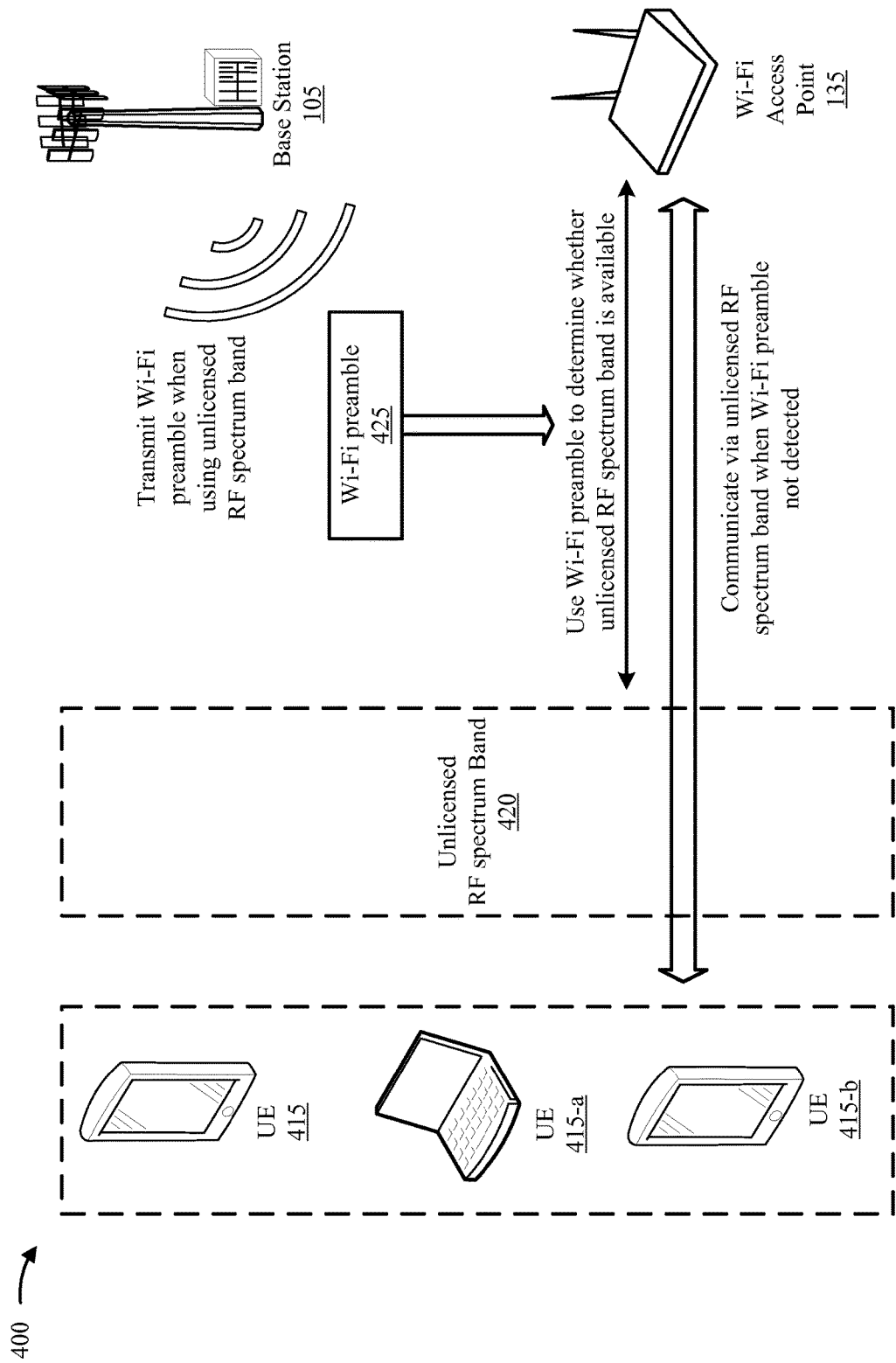

FIGS. 4A and 4B are illustrations of an overview of an example 400, in accordance with various aspects of the present disclosure. As shown in FIG. 4A, base station 105 and a Wi-Fi access point 135 may be capable of communicating with UEs 415, 415-a, and/or 415-b via an unlicensed RF spectrum band. In some examples, the UEs 415 may be one of the UEs 115, 115-a, 215, 215-a, 215-b, and/or 215-c described with reference to FIG. 1 and/or FIG. 2. As further shown, base station 105 may contend for access to the unlicensed RF spectrum band 420 and may gain access to the unlicensed RF spectrum band 420 when it is available. After winning contention to the unlicensed RF spectrum band 420, the base station 105 may occupy the unlicensed RF spectrum band 420 for a period of time for communication.

As further shown in FIG. 4A, the Wi-Fi access point 135 may also contend for access to the unlicensed RF spectrum band 420. For example, the Wi-Fi access point 135 may detect energy levels of the unlicensed RF spectrum band 420. If the unlicensed RF spectrum band 420 is unavailable (e.g., if the energy level is higher than a threshold), the Wi-Fi access point 135 may wait before contending for access to the unlicensed RF spectrum band 420 again. In some cases, every time the Wi-Fi access point 135 determines that the unlicensed RF spectrum band 420 is unavailable, the Wi-Fi access point 135 may increase an amount of time that the Wi-Fi access point 135 waits before contending for access again. This may starve the Wi-Fi access point 135 of access to the unlicensed RF spectrum band 420, leaving the Wi-Fi access point 135 unable to communicate with the UEs 415, as shown.

As shown in FIG. 4B, the base station 105 may transmit a Wi-Fi preamble 425 when using the unlicensed RF spectrum band 420. The Wi-Fi access point 135 may determine whether the unlicensed RF spectrum band 420 is available by monitoring for the Wi-Fi preamble 425 before transmitting via the unlicensed RF spectrum band 420. This may allow the Wi-Fi access point 135 to determine the availability of the unlicensed RF spectrum band 420 more accurately than merely detecting an energy level of the unlicensed RF spectrum band 420. In some cases, the energy level may indicate that the unlicensed RF spectrum band 420 is unavailable (e.g., due to noise, interference, etc.), when in fact the unlicensed RF spectrum band 420 is available. Thus, by transmitting a Wi-Fi preamble 425, the base station 105 (or another type of device, e.g. an eNodeB using an LTE radio access technology deployed in the unlicensed RF spectrum band 420) may assist the Wi-Fi access point 135 in determining the availability of the unlicensed RF spectrum band 420, and communicating with the UEs 415 via the unlicensed RF spectrum band 420.

FIG. 5 is a flow diagram of an example process 500 for transmitting a first transmission indicator and a second transmission indicator via an unlicensed RF spectrum band, in accordance with various aspects of the present disclosure. In some aspects, one or more process blocks of FIG. 5 may be performed by base station 105. In some aspects, one or more process blocks of FIG. 5 may be performed by another device or a group of devices separate from or including base station 105, such as UE 115 and/or Wi-Fi access point 135.

As shown in FIG. 5, process 500 may include determining that an unlicensed RF spectrum band is available for a communication (block 510). For example, base station 105 (and/or UE 115) may determine whether the unlicensed RF spectrum band is available for a communication. In some aspects, base station 105 may determine whether the unlicensed RF spectrum band is available for a communication by performing a clear channel assessment (CCA) procedure (e.g., a CCA procedure, an extended CCA (eCCA) procedure, or the like).

The clear channel assessment procedure may include detecting an energy level associated with the unlicensed RF spectrum band (e.g., an energy level of radio signals in one or more RF channels of the unlicensed RF spectrum band), in some aspects. For example, base station 105 may detect an energy level associated with the unlicensed RF spectrum band. If the energy level satisfies a threshold energy level (e.g., is greater than the threshold energy level), then base station 105 may determine that the unlicensed RF spectrum band (e.g., a channel of the unlicensed RF spectrum band on which the energy is detected) is unavailable for a communication. Conversely, if the energy level does not satisfy the threshold energy level (e.g., is less than or equal to the threshold energy level), then base station 105 may determine that the unlicensed RF spectrum band is available for a communication.

Additionally, or alternatively, the clear channel assessment procedure may include monitoring for a transmission indicator associated with the unlicensed RF spectrum band. For example, base station 105 may monitor the unlicensed RF spectrum band (e.g., by listening for communications on an RF channel of the unlicensed RF spectrum band) for a transmission indicator. The transmission indicator may include a first transmission indicator, such as a Wi-Fi preamble, associated with a Wi-Fi radio access technology. Additionally, or alternatively, the transmission indicator may include a second transmission indicator associated with an LTE radio access technology (RAT) deployed in the unlicensed RF spectrum band. For example, the second transmission indicator may include a channel usage beacon symbol (CUBS) that indicates that a device is communicating using an LTE RAT deployed in the unlicensed RF spectrum band. The transmission indicator may be used to indicate that a device is communicating via the unlicensed RF spectrum band (e.g., on an RF channel). Additionally, or alternatively, the transmission indicator may indicate a type of RAT that the device is using to communicate via the unlicensed RF spectrum band (e.g., a Wi-Fi RAT, an LTE RAT deployed in the unlicensed RF spectrum band, etc.).

In some aspects, Wi-Fi access point 135 may be capable of detecting and decoding the first transmission indicator (e.g., a Wi-Fi preamble), but may not be capable of detecting and/or decoding the second transmission indicator (e.g., a CUBS). In some aspects, base station 105 and/or UE 115 may be capable of detecting and decoding both the first transmission indicator and the second transmission indicator.

When base station 105 detects the transmission indicator, base station 105 may determine that the unlicensed RF spectrum band is unavailable for a communication. Conversely, when base station 105 does not detect the transmission indicator (e.g., after monitoring the unlicensed RF spectrum band for a threshold period of time), base station 105 may determine that the unlicensed RF spectrum band is available for a communication. In some aspects, the transmission indicator may include a duration indicator that indicates a time period during which the unlicensed RF spectrum band will be unavailable (e.g., a duration of occupancy of the unlicensed RF spectrum band). Base station 105 may use this duration indicator to determine when the unlicensed RF spectrum band may be available for a communication.

As further shown in FIG. 5, process 500 may include determining one or more transmission characteristics associated with a first transmission indicator and/or a second transmission indicator to be transmitted via the unlicensed RF spectrum band (block 520). For example, base station 105 (and/or UE 115) may determine one or more transmission characteristics of a first transmission indicator. As described above, a first transmission indicator may indicate that a source device, that transmitted the first transmission indicator, is communicating via the unlicensed RF spectrum band using a Wi-Fi radio access technology. The first transmission indicator may be in a format that is detectable and decodable by a device that communicates using Wi-Fi radio access technology, such as Wi-Fi access point 135 and/or UE 115. The format of the first transmission indicator may be based at least in part on a protocol of the Wi-Fi communication. For example, the first transmission indicator may be of 802.11 ac format when the communication uses 802.11 ac protocol. As another example, the first transmission indicator may be of 802.11n format when the communication uses 802.11n protocol. In some aspects, the first transmission indicator may include a Wi-Fi preamble (e.g., a Physical Layer Convergence Protocol (PLCP) preamble, a Long PLCP Protocol Data Unit (PPDU) preamble, a Short PPDU preamble, etc.).

As another example, base station 105 may determine one or more transmission characteristics of a second transmission indicator. As described above, a second transmission indicator may indicate that a source device, that transmitted the second transmission indicator, is communicating via the unlicensed RF spectrum band using an LTE RAT deployed in the unlicensed RF spectrum band. The second transmission indicator may be in a format that is detectable and decodable by a device that communicates using the LTE RAT deployed in the unlicensed RF spectrum band, such as base station 105 and/or UE 115. In some aspects, the second transmission indicator may be transmitted as a channel usage beacon symbol (CUBS). The CUBS may indicate that base station 105 and/or UE 115 has reserved a channel of the unlicensed RF spectrum band.

A transmission characteristic may include, for example, an order in which the first transmission indicator and the second transmission indicator are transmitted. In some aspects, the transmission characteristic may indicate to transmit the first transmission indicator before the second transmission indicator. In some aspects, the transmission characteristic may indicate to transmit the first transmission indicator after the second transmission indicator. In some aspects, the transmission characteristic may indicate to transmit the first transmission indicator and the second transmission indicator concurrently (e.g., by embedding the first transmission indicator in the second transmission indicator, by embedding the second transmission indicator in the first transmission indicator, etc.).

In some aspects, base station 105 may include the first transmission indicator and the second transmission indicator in one or more fields of one or more communication structures. A communication structure may include, for example, a packet, a datagram, a segment, a block, a cell, a frame, a subframe, a slot, a symbol, or the like. For example, the first transmission indicator may be included in a first field of a communication structure, and the second transmission indicator may be included in a second field of the communication structure. In some aspects, the first field may precede the second field in the communication structure. In some aspects, the second field may precede the first field in the communication structure. In some aspects, the first transmission indicator and the second transmission indicator may be included in the same field of the communication structure. A transmission characteristic may indicate how many fields are used to transmit the first transmission indicator and/or the second transmission indicator, an order of the fields, or the like.

In some aspects, a transmission characteristic may indicate whether content is to be included in the transmission indicator. Additionally, or alternatively, a transmission characteristic may identify the content to be included in the transmission indicator. The content may include, for example, a source device identifier (e.g., a network address, such as an Internet protocol (IP) address, a media access control (MAC) address, etc.) that identifies a source device that transmitted the transmission indicator, a source device type indicator that identifies a type of the source device (e.g., a type of device that uses a Wi-Fi RAT, a type of device that uses an LTE RAT deployed in the unlicensed RF spectrum band, a Wi-Fi access point, an eNodeB, a UE, etc.), a network operator identifier that identifies a network operator associated with the source device, a radio access technology identifier that identifies a radio access technology associated with the transmission indicator (e.g., Wi-Fi RAT, LTE RAT deployed in the unlicensed RF spectrum band, etc.), a duration indicator that indicates a duration of a communication associated with the transmission indicator, or the like. In some aspects, the second transmission indicator (e.g., a CUBS) may include an indication that the first transmission indicator (e.g., a Wi-Fi preamble) was transmitted and/or is also being transmitted. Base station 105 may include content in a transmission indicator based on the transmission characteristic.

A transmission characteristic may indicate a length of the transmission indicator, in some aspects. For example, base station 105 may use a quantity of orthogonal frequency division multiplexing (OFDM) symbols between a minimum of one OFDM symbol and a maximum of M available OFDM symbols (M>1) (inclusive), for the second transmission indicator. In this case, base station 105 may use the remaining available OFDM symbols (e.g., M minus the quantity of OFDM symbols used for the second transmission indicator) for the first transmission indicator. Base station

105 may adjust the quantity of symbols used for the second transmission indicator and/or the first transmission indicator based on a transmission characteristic (e.g., to satisfy a transmission power requirement, a spectral mask requirement, etc.).

In some aspects, a transmission characteristic may identify a type of first transmission indicator to be transmitted. For example, base station 105 may monitor a network and/or the unlicensed RF spectrum band to determine a protocol associated with Wi-Fi access point 135 that is communicating via the network and/or via the unlicensed RF spectrum band. In some aspects, base station 105 may detect a packet transmitted by Wi-Fi access point 135, and the packet may indicate a Wi-Fi protocol associated with Wi-Fi access point 135. Additionally, or alternatively, base station 105 may request and/or receive, from another device (e.g., UE 115, Wi-Fi access point 135, etc.), information that identifies one or more Wi-Fi protocols being used to communicate via the network and/or via the unlicensed RF spectrum band. Additionally, or alternatively, base station 105 may detect an antenna configuration of Wi-Fi access point 135, and may determine a Wi-Fi protocol based on the antenna configuration.

A Wi-Fi protocol may include, for example, an 802.11a protocol, an 802.11n protocol, an 802.11ac protocol, or the like. Different Wi-Fi protocols may be associated with different first transmission indicators (e.g., different Wi-Fi preambles). In this case, base station 105 may transmit a type of first transmission indicator associated with the determined protocol. In some aspects, base station 105 may determine to transmit multiple types of first transmission indicators (e.g., when multiple protocols, associated with different types of Wi-Fi access points 135, are detected). Additionally, or alternatively, base station 105 may determine a Wi-Fi protocol that is decodable by multiple Wi-Fi access points 135 communicating via the network and/or via the unlicensed RF spectrum band. Base station 105 may determine to transmit the first transmission indicator (e.g., the Wi-Fi preamble) using the Wi-Fi protocol.

In some aspects, base station 105 may determine one or more transmission characteristics based on pre-configured information (e.g., information stored by base station 105). Additionally, or alternatively, base station 105 may determine one or more transmission characteristics based on information received from one or more other devices (e.g., UE 115, Wi-Fi access point 135, etc.). Additionally, or alternatively, base station 105 may determine one or more transmission characteristics by monitoring the unlicensed RF spectrum band and/or a network associated with the unlicensed RF spectrum band.

As further shown in FIG. 5, process 500 may include transmitting, via the unlicensed RF spectrum band, the first transmission indicator and the second transmission indicator (block 530). For example, base station 105 (and/or UE 115) may transmit the first transmission indicator and/or the second transmission indicator via the unlicensed RF spectrum band. In some aspects, base station 105 may transmit the first transmission indicator and/or the second transmission indicator based on one or more determined transmission characteristics, as described above.

In some aspects, base station 105 may periodically transmit the first transmission indicator and/or the second transmission indicator. For example, base station 105 may transmit the first transmission indicator and/or the second transmission indicator once per LTE frame (e.g., once every 10 milliseconds). In some aspects, base station 105 may synchronize and/or coordinate the timing of the transmission of the first transmission indicator and/or the second transmission indicator. For example, base station 105 may synchronize the transmission with transmissions from one or more other base stations 105. As another example, base station 105 may coordinate the timing of the transmission so as to increase the detectability of the first transmission indicator by one or more Wi-Fi access points 135. Additionally, or alternatively, UE 115 may transmit the first transmission indicator during a time period when UE 115 is scheduled to transmit data over the channel.

As further shown in FIG. 5, process 500 may include transmitting the communication via the unlicensed RF spectrum band (block 540). For example, base station 105 (and/or UE 115) may transmit the communication via the unlicensed RF spectrum band. In some aspects, the communication may include the first transmission indicator and/or the second transmission indicator. Additionally, or alternatively, the communication may include control information, a payload, and/or other information. For example, base station 105 may transmit (e.g., in a body of the communication) a control transmission (e.g., physical downlink control channel (PDCCH) information, enhanced PDCCH (ePDCCH) information, etc.), a data transmission (e.g., physical downlink shared channel (PDSCH) information, etc.), or the like. Additionally, or alternatively, UE 115 may transmit (e.g., in a body of the communication) a data transmission (e.g., physical uplink shared channel (PUSCH) information, etc.), or the like. In some aspects, base station 105 and/or UE 115 may transmit the communication after transmitting the first transmission indicator and/or the second transmission indicator.

By transmitting the first transmission indicator and the second transmission indicator, base station 105 may permit Wi-Fi access point 135 to more accurately determine the availability of the unlicensed RF spectrum band for a communication. Furthermore, base station 105 may permit another device (e.g., UE 115, another base station 105, etc.) to selectively contend for access to the unlicensed RF spectrum band, and/or to transmit via the unlicensed RF spectrum band, based on information included in a transmission indicator.

Furthermore, the transmission indicator(s) may assist in determining a type of source device that transmitted the transmission indicator(s), as described in more detail elsewhere herein. For example, Wi-Fi access point 135 may transmit a first transmission indicator when using Wi-Fi RAT, while an LTE device (e.g., base station 105, UE 115, etc.) may transmit both a first transmission indicator and a second transmission indicator when using LTE RAT deployed in the unlicensed RF spectrum band. Devices capable of communicating using both Wi-Fi RAT and LTE RAT deployed in the unlicensed RF spectrum band (e.g., UE 115) may transmit the first transmission indicator when communicating using Wi-Fi RAT in the unlicensed RF spectrum band, and may transmit both the first transmission indicator and the second transmission indicator when communicating using LTE RAT deployed in the unlicensed RF spectrum band.

While some process blocks are described above as being performed by base station 105, UE 115 and/or another device may perform these process blocks, in some aspects. Furthermore, while the first transmission indicator is described as being associated with Wi-Fi RAT, and the second transmission indicator is described as being associated with LTE RAT deployed in the unlicensed RF spectrum band, some aspects may use one or more transmission indicators associated with other radio access technologies.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6A:
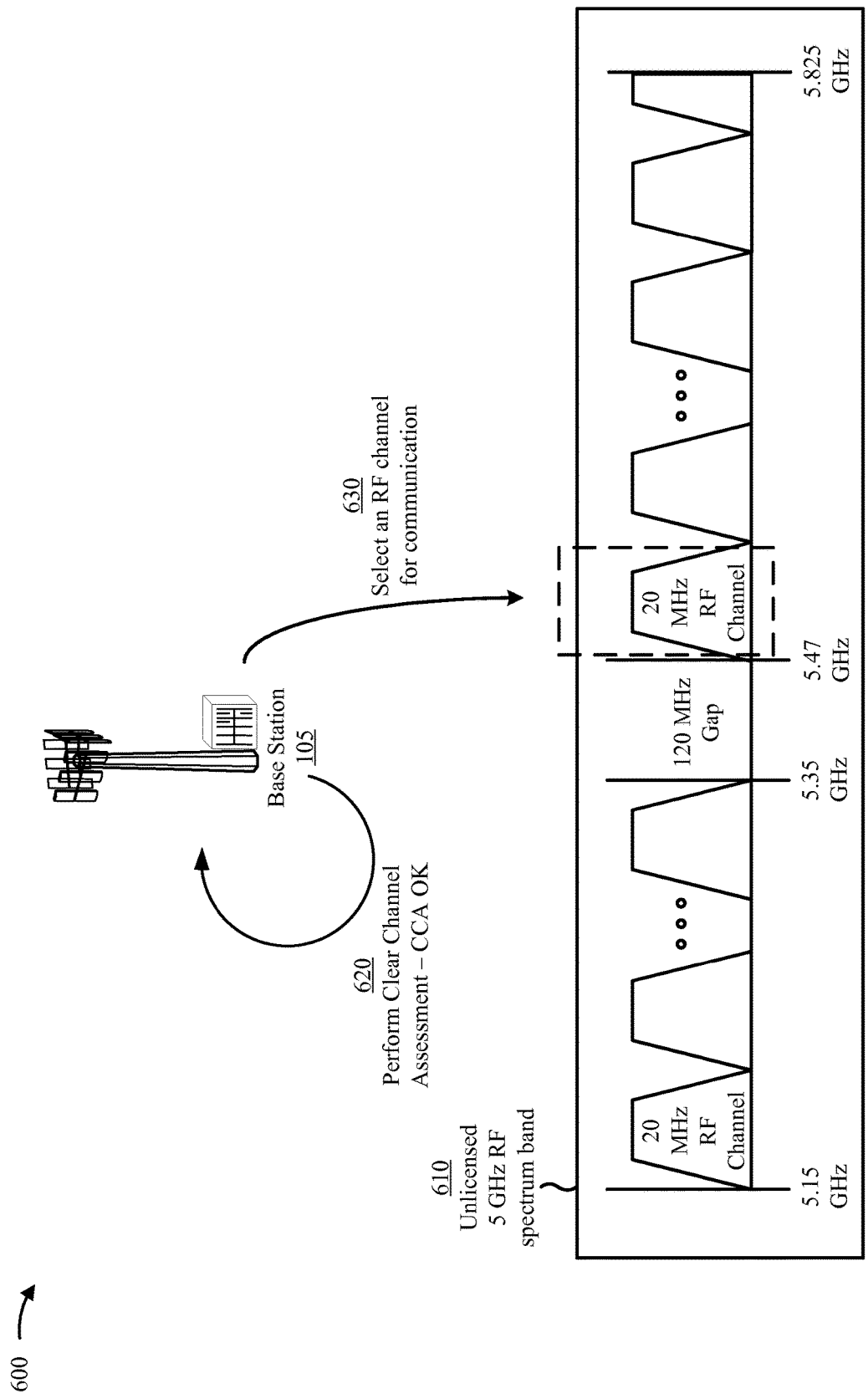
FIGS. 6A and 6B are illustrations of an example relating to the example process shown in FIG. 5, in accordance with various aspects of the present disclosure.
Figure 6B:
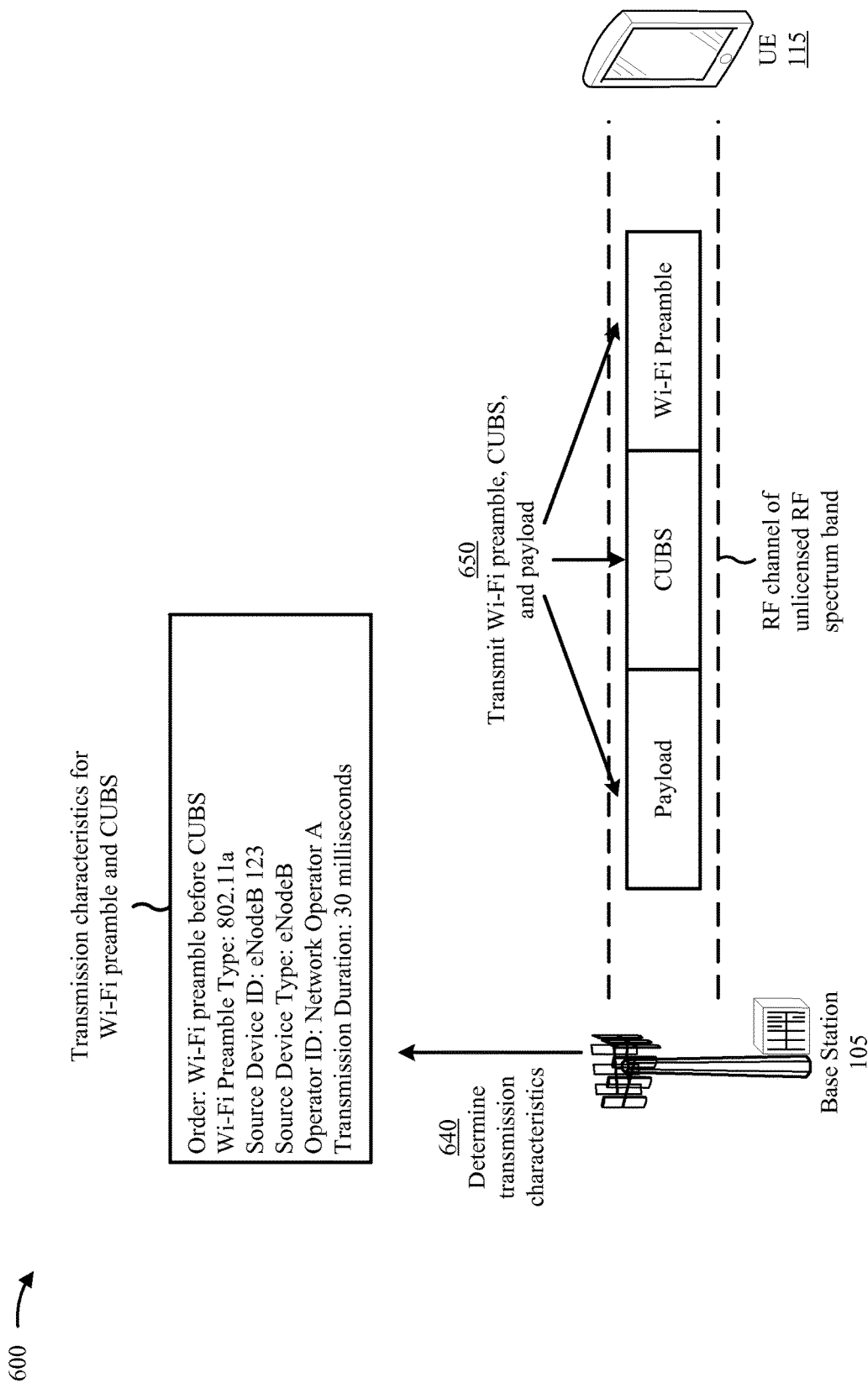

FIGS. 6A and 6B are illustrations of an example 600 relating to the example process 500 shown in FIG. 5, in accordance with various aspects of the present disclosure. FIGS. 6A and 6B show an example of transmitting a first transmission indicator and a second transmission indicator via an unlicensed RF spectrum band.

As shown in FIG. 6A, and by reference number 610, assume that the unlicensed RF spectrum band includes a portion of unlicensed RF spectrum in the 5 GHz band. For example, assume that the unlicensed RF spectrum band includes one or more RF channels (e.g., 20 MHz RF channels) between 5.15 GHz and 5.35 GHz. Further, assume that the unlicensed RF spectrum band includes one or more RF channels between 5.47 GHz and 5.825 GHz. As shown by reference number 620, assume that base station 105 performs a clear channel assessment procedure. Based on the clear channel assessment procedure, assume that base station 105 determines that the unlicensed RF spectrum band is available for a communication. Further, as shown by reference number 630, assume that base station 105 selects an RF channel for the communication.

As shown in FIG. 6B, and by reference number 640, assume that base station 105 determines transmission characteristics associated with a Wi-Fi preamble and a CUBS to be transmitted via the unlicensed RF spectrum band. For example, and as shown, assume that base station 105 determines to transmit the Wi-Fi preamble before transmitting the CUBS, determines to transmit the Wi-Fi preamble using the 802.11a Wi-Fi protocol, determines to include a source device identifier that identifies base station 105 as "eNodeB 123," determines to include a source device type indicator that identifies base station 105 as an eNodeB, determines to include a network operator identifier that identifies a network operator of base station 105 as "Network Operator A," and determines to include a duration indicator that indicates 30 milliseconds as a duration of the communication from base station 105. Assume that base station 105 generates the Wi-Fi preamble and the CUBS based on these transmission characteristics.

As shown by reference number 650, assume that base station 105 transmits Wi-Fi preamble, the CUBS, and the communication (e.g., a payload), via the selected RF channel of the unlicensed RF spectrum band. In this way, base station 105 may notify other devices (e.g., UE 115, Wi-Fi access point 135, another base station 105, etc.) that base station 105 is using the RF channel. Additional details regarding the manner in which the Wi-Fi preamble and the CUBS are provided via the RF channel are described in more detail herein in connection with FIGS. 7A and 7B.

As indicated above, FIGS. 6A and 6B are provided merely as an example. Other examples are possible and may differ from what was described with regard to FIGS. 6A and 6B.

Figure 7A:
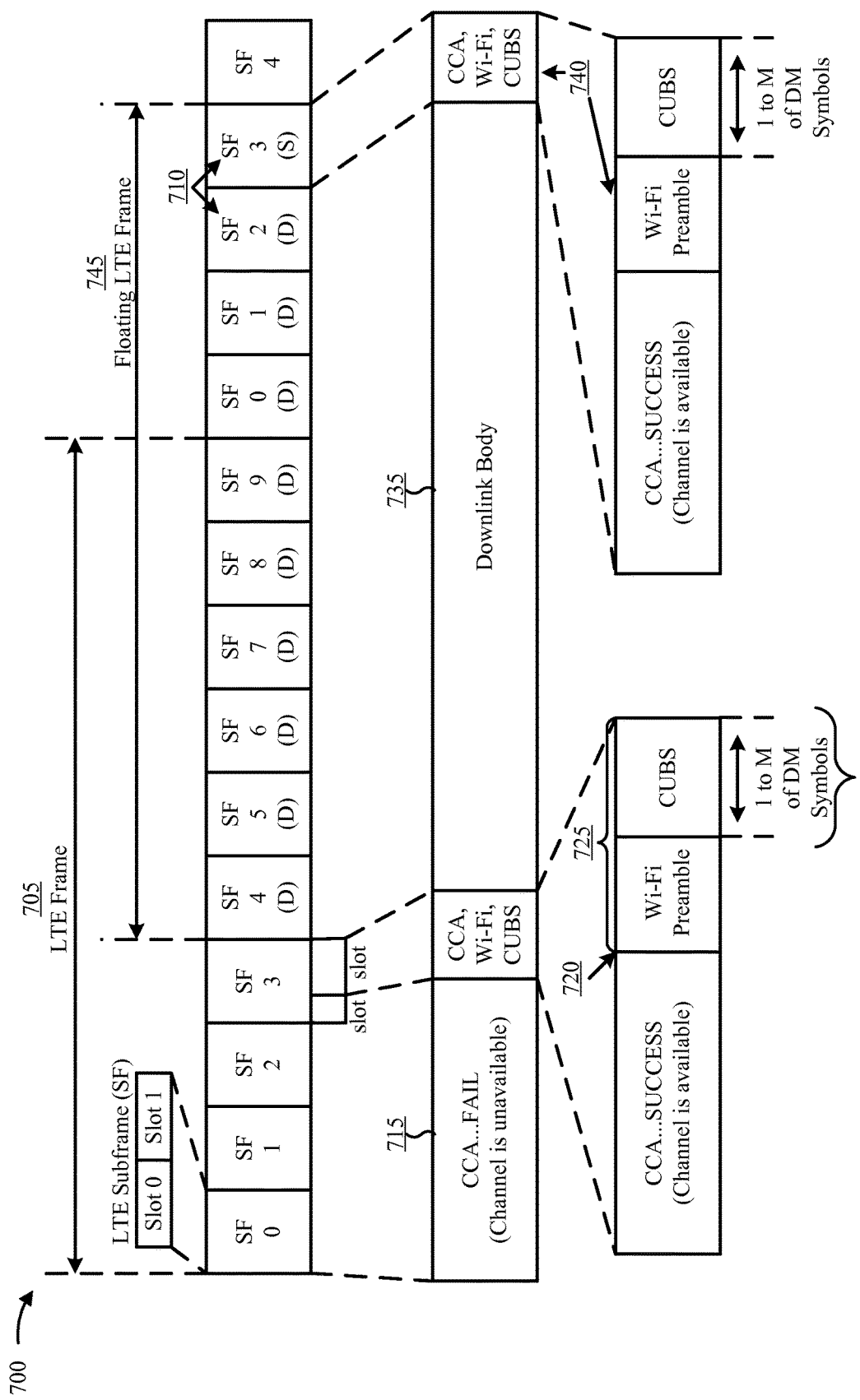
FIGS. 7A and 7B are illustrations of another example relating to the example process shown in FIG. 5, in accordance with various aspects of the present disclosure.
Figure 7B:
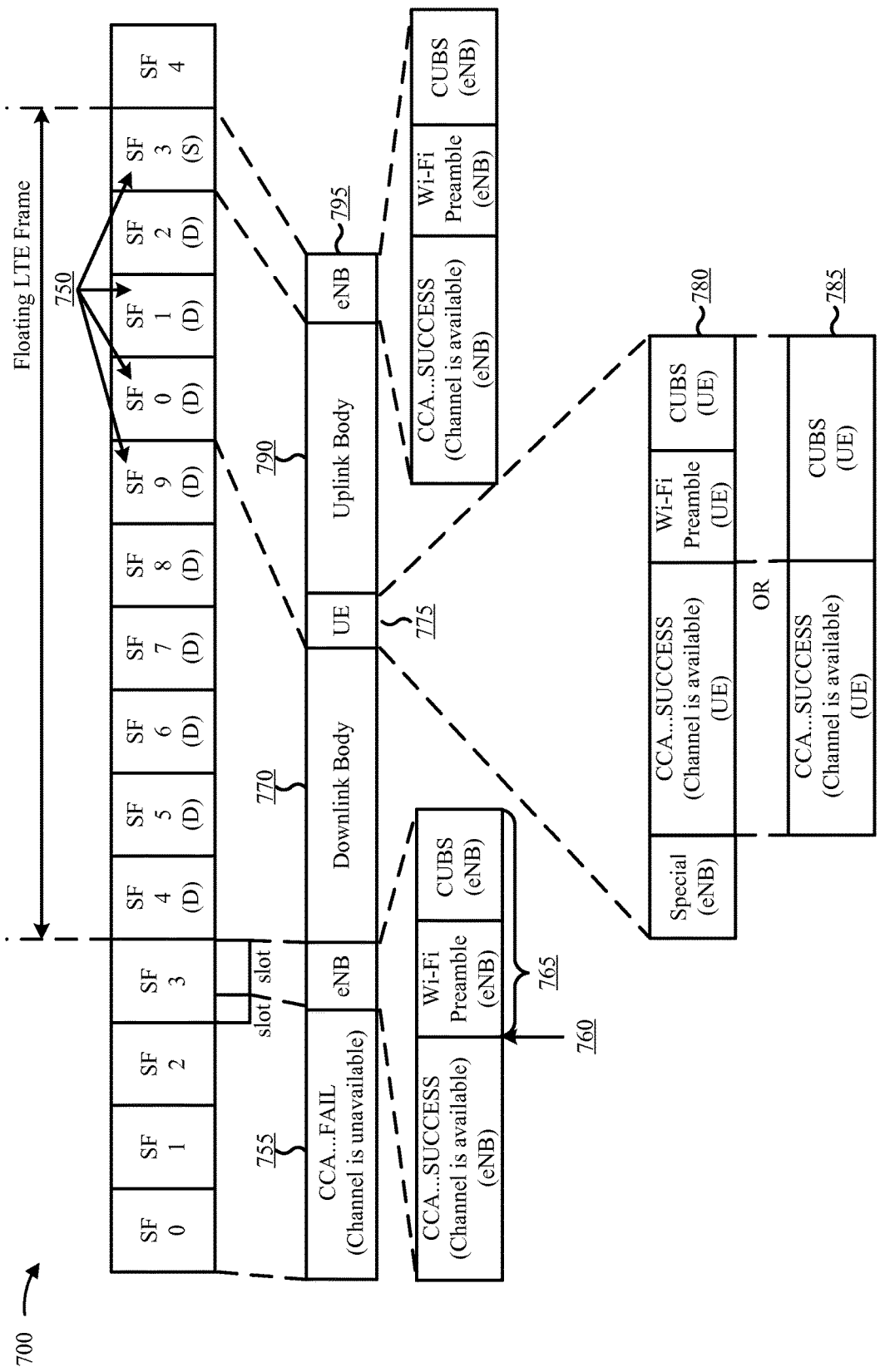

FIGS. 7A and 7B are illustrations of another example 700 relating to example process 500 shown in FIG. 5, in accordance with various aspects of the present disclosure. FIGS. 7A and 7B show an example of transmitting a Wi-Fi preamble and a CUBS via the unlicensed RF spectrum band.

For the purpose of FIG. 7A, assume that base station 105 transmits a wireless communication, via the unlicensed RF spectrum band, in a supplemental downlink mode (e.g., licensed assisted access mode). The supplemental downlink mode (e.g., licensed assisted access mode) may utilize the unlicensed RF spectrum band for downlink communications (e.g., communications from base station 105 to UE 115), and not for uplink communications (e.g., communications from UE 115 to base station 105). The supplemental downlink mode (e.g., licensed assisted access mode) may be used to alleviate high traffic volumes in the downlink.

As shown in FIG. 7A, base station 105, which transmits information using an LTE RAT deployed in the unlicensed RF spectrum band, may coordinate communications using LTE frames. As shown by reference number 705, an LTE frame may be ten milliseconds in length, and may include ten subframes of one millisecond each. As further shown, each subframe may include two slots of 0.5 milliseconds each. A slot may include a quantity of OFDM symbols (e.g., 6 symbols or 7 symbols, depending on a cyclic prefix and/or guard period length). As shown by reference number 710, in the supplemental downlink mode (e.g., licensed assisted access mode), a subframe may be used for a downlink transmission (D) or a special transmission (S) (e.g., a guard period, or the like). In this case, the special transmission may be used for performing a clear channel assessment procedure, and/or for transmission of the Wi-Fi preamble and/or the CUBS.

As shown by reference number 715, assume that base station 105 monitors the unlicensed RF spectrum band during some initial time period (e.g., subframes 0, 1, and 2, and a first slot of subframe 3) by performing a clear channel assessment (CCA) procedure. Assume that during this initial time period, the unlicensed RF spectrum band is unavailable, and that the CCA procedure fails. As shown by reference number 720, assume that at some point during subframe 3 (e.g., in the second slot of subframe 3), the CCA procedure succeeds, and base station 105 determines that the unlicensed RF spectrum band is available for a communication.

At this point, and as shown by reference number 725, base station 105 transmits a Wi-Fi preamble, followed by a CUBS, within subframe 3. As shown by reference number 730, base station 105 may adjust a length of the CUBS based on when the CCA procedure succeeded within subframe 3 (e.g., based on when base station 105 determined that the unlicensed RF spectrum band is available for a communication). For example, base station 105 may determine a length of the CUBS (e.g., from 1 OFDM symbol to M OFDM symbols) such that the Wi-Fi preamble and the CUBS occupy a remainder of subframe 3 following the successful CCA procedure. In some aspects, the Wi-Fi preamble may have a fixed length, and the CUBS may have a variable length.

As shown by reference number 735, after transmitting the Wi-Fi preamble and the CUBS, base station 105 may transmit the body of the downlink communication (e.g., which may include control information, a payload, or the like). As shown, assume that base station 105 transmits the body of the downlink communication for nine subframes (e.g., subframes 4, 5, 6, 7, 8, 9, 0, 1, and 2). As shown by reference number 740, during the tenth subframe, assume that base station 105 performs the CCA procedure to determine whether the unlicensed RF spectrum band is still available. If the unlicensed RF spectrum band remains available, base station 105 re-transmits the Wi-Fi preamble and the CUBS before transmitting the next portion of the body of the downlink communication. By periodically performing the CCA procedure, such as once per LTE frame, base station 105 may increase fairness in contending for access to the unlicensed RF spectrum band.

As shown by reference number 745, upon completion of the CCA procedure and transmission of the Wi-Fi preamble and the CUBS, a floating LTE frame may begin. The floating LTE frame may be ten milliseconds in length, and may include ten subframes of one millisecond each. As shown, nine of the subframes may be used for downlink transmissions, and one of the subframes may be used for a special transmission to perform the CCA procedure and transmit the Wi-Fi preamble and the CUBS. The floating LTE frame may be referred to as "floating" because the first subframe of the floating LTE frame may change depending on when the unlicensed RF spectrum band becomes available.

In some aspects, multiple base stations 105 (e.g., associated with the same network operator) may negotiate a synchronization point based on a starting frame and/or an ending frame of the floating LTE frame. In this way, base station 105 may increase the efficiency of operations performed by the multiple base stations 105, and may increase the detectability of the Wi-Fi preamble (e.g., by Wi-Fi access point 135).

For the purpose of FIG. 7B, assume that base station 105 and/or UE 115 transmits a wireless communication, via the unlicensed RF spectrum band, in a carrier aggregation mode. The carrier aggregation mode may utilize the unlicensed RF spectrum band for both downlink communications and uplink communications (e.g., communications from UE 115 to base station 105). In the carrier aggregation mode, the amount of resources (e.g., the quantity of subframes) used for downlink communications and uplink communications may be adjusted depending on resource demands.

As shown in FIG. 7B, and by reference number 750, in the carrier aggregation mode, a subframe may be used for a downlink transmission (D), an uplink transmission (U), a first special transmission (S), or a second special transmission (S'). In this case, the first special transmission may be used by base station 105 (e.g., shown as "eNB") for performing a clear channel assessment procedure, and/or for transmission, by base station 105, of the Wi-Fi preamble and/or the CUBS. Furthermore, the second special transmission may be used by UE 115 (e.g., shown as "UE") for performing a clear channel assessment procedure, and/or for transmission, by UE 115, of the Wi-Fi preamble and/or the CUBS.

As shown by reference number 755, assume that base station 105 monitors the unlicensed RF spectrum band during some initial time period (e.g., subframes 0, 1, and 2, and a first slot of subframe 3) by performing a clear channel assessment (CCA) procedure. Assume that during this initial time period, the unlicensed RF spectrum band is unavailable, and that the CCA procedure fails. As shown by reference number 760, assume that at some point during subframe 3 (e.g., in the second slot of subframe 3), the CCA procedure succeeds, and base station 105 determines that the unlicensed RF spectrum band is available for a downlink communication.

At this point, and as shown by reference number 765, base station 105 transmits a Wi-Fi preamble, followed by a CUBS, within subframe 3, as described above in connection with FIG. 7A. As shown by reference number 770, after transmitting the Wi-Fi preamble and the CUBS, the floating LTE frame may begin, and base station 105 may transmit the body of the downlink communication. As shown, assume that base station 105 transmits the body of the downlink communication for six subframes (e.g., subframes 4, 5, 6, 7, 8, and 9).

As shown by reference number 775, during the seventh subframe of the floating LTE frame (e.g., subframe 0), assume that UE 115 performs the CCA procedure to determine whether the unlicensed RF spectrum band is available for an uplink communication. If the unlicensed RF spectrum band remains available, UE 115 may transmit the Wi-Fi preamble and the CUBS before transmitting the body of the uplink communication, as shown by reference number 780. Alternatively, and as shown by reference number 785, UE 115 may transmit the CUBS (e.g., depending on a transmission characteristic determined by UE 115). Additionally, or alternatively, a portion of the seventh subframe may be used by base station 105 to perform a time-division duplex (TDD) procedure.

As shown by reference number 790, after transmitting the Wi-Fi preamble and/or the CUBS, UE 115 may transmit the body of the uplink communication. As shown, assume that UE 115 transmits the body of the uplink communication for two subframes (e.g., subframes 1 and 2). In some aspects, base station 105 may adjust a quantity of subframes used for downlink communications and/or uplink communications, and may provide information that identifies this quantity to UE 115. In this way, base station 105 and UE 115 may utilize the unlicensed RF spectrum band to alleviate high uplink traffic and/or high downlink traffic, depending on a traffic demand.

As shown by reference number 795, during the tenth subframe of the floating LTE frame (e.g., subframe 3), assume that base station 105 performs the CCA procedure to determine whether the unlicensed RF spectrum band is still available. If the unlicensed RF spectrum band remains available, base station 105 re-transmits the Wi-Fi preamble and the CUBS before transmitting the next portion of the body of the downlink communication. By periodically performing the CCA procedure, such as once per LTE frame, base station 105 may increase fairness in contending for access to the unlicensed RF spectrum band.

As indicated above, FIGS. 7A and 7B are provided merely as an example. Other examples are possible and may differ from what was described with regard to FIGS. 7A and 7B.

FIG. 8 is a flow diagram of an example process 800 for selectively contending for access to and/or selectively transmitting via the unlicensed RF spectrum band based on a detected transmission indicator, in accordance with various aspects of the present disclosure. In some aspects, one or more process blocks of FIG. 8 may be performed by base station 105. In some aspects, one or more process blocks of FIG. 8 may be performed by another device or a group of devices separate from or including base station 105, such as UE 115 and/or Wi-Fi access point 135.

As shown in FIG. 8, process 800 may include monitoring an unlicensed RF spectrum band for a first transmission indicator and/or a second transmission indicator (block 810). For example, base station 105 may monitor the unlicensed RF spectrum band. In some aspects, base station 105 may continuously monitor the unlicensed RF spectrum band for a first transmission indicator (e.g., when base station 105 is not transmitting via the unlicensed RF spectrum band). The first transmission indicator may be associated with a Wi-Fi RAT, and the second transmission indicator may be associated with an LTE RAT deployed in the unlicensed RF spectrum band. Additionally, or alternatively, base station 105 may periodically monitor the unlicensed RF spectrum band for the first transmission indicator (e.g., during a subframe). In some aspects, base station 105 may monitor the unlicensed RF spectrum band during a time period negotiated with one or more other base stations 105. Additionally, or alternatively, base station 105 may monitor the unlicensed RF spectrum band when determining whether the unlicensed RF spectrum band is available for a communication (e.g., during a clear channel assessment procedure).

In some aspects, UE 115 may monitor the unlicensed RF spectrum band (e.g., continuously, periodically, during a negotiated time period, when determining whether the unlicensed RF spectrum band is available for a communication, etc.). In some aspects, UE 115 may monitor the unlicensed RF spectrum band when in a low power mode (e.g., a power saving mode, a sleep mode, a discontinuous reception mode, etc.). In this way, UE 115 may conserve power when monitoring the unlicensed RF spectrum band.

As further shown in FIG. 8, process 800 may include detecting the first transmission indicator, associated with a Wi-Fi radio access technology (block 820). For example, base station 105 (and/or UE 115) may detect the first transmission indicator. The first transmission indicator may be associated with Wi-Fi RAT. For example, the first transmission indicator may include a Wi-Fi preamble, and is described in more detail above in connection with FIG. 5.

As further shown in FIG. 8, process 800 may include determining a source device type of a source device that transmitted the first transmission indicator (block 830). For example, base station 105 (and/or UE 115) may determine a source device type of a source device. The source device may include a device that transmitted the first transmission indicator. In some aspects, the source device type may include a Wi-Fi access point (e.g., Wi-Fi access point 135 and/or another device that communicates using a Wi-Fi radio access technology). A Wi-Fi access point may be capable of detecting and/or decoding the first transmission indicator (e.g., a Wi-Fi preamble). In some cases, a Wi-Fi access point may not be capable of detecting and/or decoding the second transmission indicator (e.g., a CUBS).

Additionally, or alternatively, the source device type may include an LTE device. An LTE device may refer to a device that communicates using an LTE RAT deployed in the unlicensed RF spectrum band. The LTE device may be capable of detecting and/or decoding the second transmission indicator (e.g., a CUBS). UE 115 and base station 105 are examples of an LTE device.

In some aspects, base station 105 may determine the source device type based on content included in a transmission indicator (e.g., the first transmission indicator and/or the second transmission indicator). For example, the transmission indicator may include a source device identifier, a source device type indicator, a radio access technology type indicator, or the like. Base station 105 may use this information to identify the source device type. Additionally, or alternatively, base station 105 may use the second transmission indicator to determine the source device type, as described below in connection with block 840.

As further shown in FIG. 8, process 800 may include determining whether the source device is a Wi-Fi access point or an LTE device (block 840). For example, base station 105 (and/or UE 115) may determine whether the source device is a Wi-Fi access point or an LTE device based on the first transmission indicator and/or the second transmission indicator. For example, if base station 105 receives a second transmission indicator and a first transmission indicator that both identify a same source device, then base station 105 may determine that the source device is an LTE device (e.g., since the source device transmitted the second transmission indicator indicating that the source device is communicating using LTE RAT deployed in the unlicensed RF spectrum band).

As another example, the source device may transmit the second transmission indicator after transmitting the first transmission indicator. In this case, base station 105 may determine that the source device is an LTE device if base station 105 detects the second transmission indicator within a threshold time period after detecting the first transmission indicator. Conversely, base station 105 may determine that the source device is a Wi-Fi access point if base station 105 does not detect the second transmission indicator within a threshold time period after detecting the first transmission indicator.

In some aspects, the source device may include a flag, in the second transmission indicator, that indicates that the source device transmitted the first transmission indicator. In this case, if base station 105 detects the second transmission indicator with the flag, base station 105 may determine that an LTE device transmitted the first transmission indicator. In some cases, the source device may not transmit the first transmission indicator when the source device does not detect any Wi-Fi access points 135 within communication range. In this case, when UE 115 (and/or base station 105) receives the second transmission indicator without the flag, UE 115 may determine that a Wi-Fi access point transmitted the first transmission indicator.

In some aspects, the source device may include the second transmission indicator and the first transmission indicator in a same field of a communication structure. In this case, base station 105 may determine that the source device is an LTE device when both transmission indicators are included in the same field. Conversely, base station 105 may determine that the source device is a Wi-Fi access point if the first transmission indicator is included in the field.

As further shown in FIG. 8, if the source device is a Wi-Fi access point (block 840—WI-FI AP), then process 800 may include waiting to contend for access to and/or to transmit via the unlicensed RF spectrum band (block 850). For example, if base station 105 (and/or UE 115) determines that the source device is a Wi-Fi access point, then base station 105 (and/or UE 115) may wait to contend for access to the unlicensed RF spectrum band. In some aspects, waiting to contend for access may include stopping a clear channel assessment procedure (e.g., stopping a procedure to determine whether the unlicensed RF spectrum band is available for a communication). Additionally, or alternatively, waiting to contend for access may include waiting for an amount of time before performing a clear channel assessment procedure. In some aspects, base station 105 may determine the amount of time based on a duration indicator included in a transmission indicator.

Additionally, or alternatively, if base station 105 (and/or UE 115) determines that the source device is a Wi-Fi access point, then base station 105 (and/or UE 115) may not transmit via the unlicensed RF spectrum band, and/or may wait to transmit via the unlicensed RF spectrum band. Waiting to transmit may include waiting for an amount of time before transmitting a communication via the unlicensed RF spectrum band. In some aspects, base station 105 may determine the amount of time based on a duration indicator included in a transmission indicator.

As further shown in FIG. 8, if the source device is an LTE device (block 840—LTE DEVICE), then process 800 may include determining a network operator associated with the first transmission indicator (block 860), and selectively contending for access to and/or selectively transmitting via the unlicensed RF spectrum band based on the network operator (block 870). For example, if base station 105 (and/or UE 115) determines that the source device is an LTE device, then base station 105 (and/or UE 115) may determine a network operator associated with the first transmission indicator.

In some aspects, base station 105 may determine the network operator based on content included in a transmission indicator (e.g., a network operator identifier, a source device identifier, a source device type indicator, etc.). For example, the transmission indicator (e.g., the first transmission indicator, the second transmission indicator, etc.) may include a network operator identifier that identifies a network operator associated with the transmission indicator (e.g., a network operator that controls and/or manages the source device).

Based on the network operator, base station 105 may determine whether to contend for access to the unlicensed RF spectrum band, may determine whether to transmit via the unlicensed RF spectrum band, may determine whether to wait to contend for access to the unlicensed RF spectrum band, and/or may determine whether to wait to transmit via the unlicensed RF spectrum band. In some aspects, base station 105 may determine a first network operator associated with base station 105, may determine a second network operator associated with the transmission indicator, and may compare the first network operator and the second network operator. Base station 105 may perform a first action with respect to the unlicensed RF spectrum band when the first network operator matches the second network operator (e.g., when the network operators are the same), and may perform a second, different action with respect to the unlicensed RF spectrum band when the first network operator does not match the second network operator (e.g., when the network operators are different).

For example, when the network operators are the same, base station 105 may contend for access to the unlicensed RF spectrum band (e.g., may not wait to perform a clear channel assessment procedure) and/or may transmit via the unlicensed RF spectrum band (e.g., may not wait to transmit). In this case, base station 105 may not need to back off of the unlicensed RF spectrum band to ensure fairness to another network operator. As another example, when the network operators are different, base station 105 may wait to contend for access to the unlicensed RF spectrum band (e.g., may wait to perform a clear channel assessment procedure) and/or may wait to transmit via the unlicensed RF spectrum band. In this case, base station 105 may back off of the unlicensed RF spectrum band to ensure fairness to another network operator. When different communications are associated with the same network operator, the network operator may manage the different communications to reduce interference. However, with different network operators, there may not be an ability to manage the different communications, and so base station 105 may back off to reduce interference.

In some aspects, base station 105 may not determine a network operator associated with the first transmission indicator. In this case, base station 105 may perform an action, with respect to the unlicensed RF spectrum band, based on determining that the source device is an LTE device (e.g., may contend for access to the unlicensed RF spectrum band, may transmit via the unlicensed RF spectrum band, may wait to contend for access to the unlicensed RF spectrum band, may wait to transmit via the unlicensed RF spectrum band, etc.). As an example, base station 105 may not wait to contend for access to the unlicensed RF spectrum band, or may not wait to transmit via the unlicensed RF spectrum band, when the source device is an LTE device. In this way, base station 105 may ensure fairness to Wi-Fi access points 135, which may have fewer mechanisms than LTE devices for increasing the likelihood of successful contention to the unlicensed RF spectrum band.

In some aspects, base station 105 and/or UE 115 may provide reporting information, associated with the unlicensed RF spectrum band, to a reporting device. The reporting information may include, for example, whether the unlicensed RF spectrum band was determined to be unavailable based on energy level detection, whether the unlicensed RF spectrum band was determined be unavailable based on transmission indicator detection, whether contention to the unlicensed RF spectrum band was successful, or the like. In this way, the reporting information may be used to improve a manner in which contention to the unlicensed RF spectrum band is performed.

While some process blocks are described above as being performed by base station 105, UE 115 and/or another LTE device may perform the process blocks, in some aspects. Furthermore, although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9A:
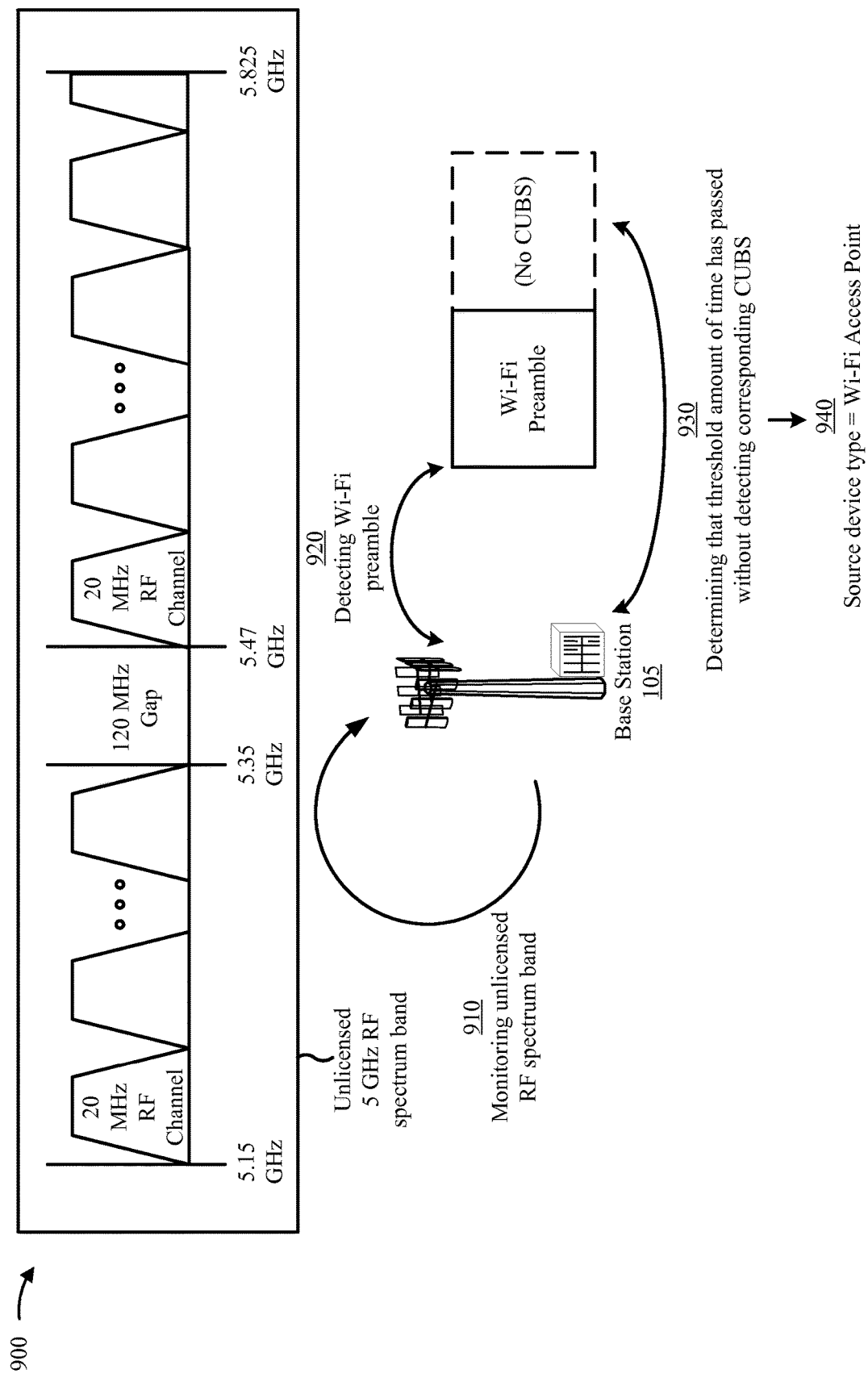
FIGS. 9A and 9B are illustrations of an example relating to the example process shown in FIG. 8, in accordance with various aspects of the present disclosure.
Figure 9B:
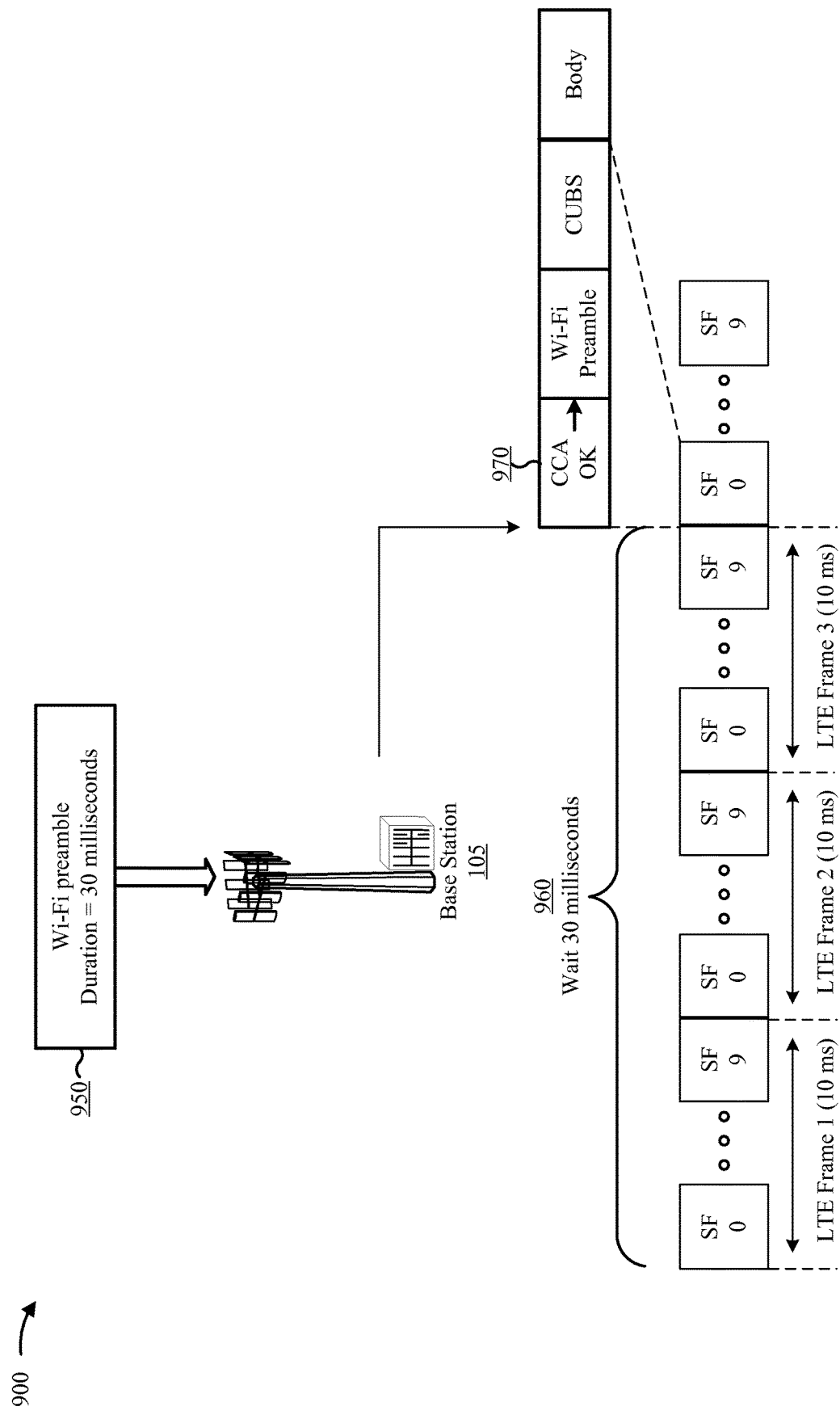

FIGS. 9A and 9B are illustrations of an example 900 relating to example process 800 shown in FIG. 8, in accordance with various aspects of the present disclosure. FIGS. 9A and 9B show an example of selectively transmitting via the unlicensed RF spectrum band based on a detected first transmission indicator.

As shown in FIG. 9A, and by reference number 910, assume that base station 105 monitors the unlicensed RF spectrum band (e.g., the unlicensed 5 GHz RF spectrum band). As shown by reference number 920, assume that base station 105 detects a Wi-Fi preamble transmitted via the unlicensed RF spectrum band. As shown by reference number 930, assume that base station 105 determines that a threshold amount of time has passed without detecting a CUBS that corresponds to the Wi-Fi preamble. In this case, base station 105 determines that the source device is a Wi-Fi access point, as shown by reference number 940.

As shown in FIG. 9B, and by reference number 950, assume that the Wi-Fi preamble includes a duration indicator that indicates a 30 millisecond duration for a communication associated with the Wi-Fi preamble. Based on the duration indicator, and based on determining that the source device is a Wi-Fi access point, base station 105 waits 30 milliseconds before transmitting a communication via the unlicensed RF spectrum band, as shown by reference number 960. As shown by reference number 970, after the 30 milliseconds have elapsed, assume that base station 105 performs a clear channel assessment procedure, and determines that the unlicensed RF spectrum band is available for a communication. Based on this, base station 105 transmits a Wi-Fi preamble, a CUBS, and a body of the communication via the unlicensed RF spectrum band. The Wi-Fi preamble notifies one or more Wi-Fi access points 135 that the unlicensed RF spectrum band is unavailable for communications from the one or more Wi-Fi access points 135. In this way, base station 105 may assist in fair utilization of the unlicensed RF spectrum band by LTE devices that use LTE RAT deployed in the unlicensed RF spectrum band (e.g., base station 105, UE 115, etc.) and Wi-Fi access points 135 that use Wi-Fi RAT to communicate via the unlicensed RF spectrum band.

As indicated above, FIGS. 9A and 9B are provided merely as an example. Other examples are possible and may differ from what was described with regard to FIGS. 9A and 9B.

Figure 10A:
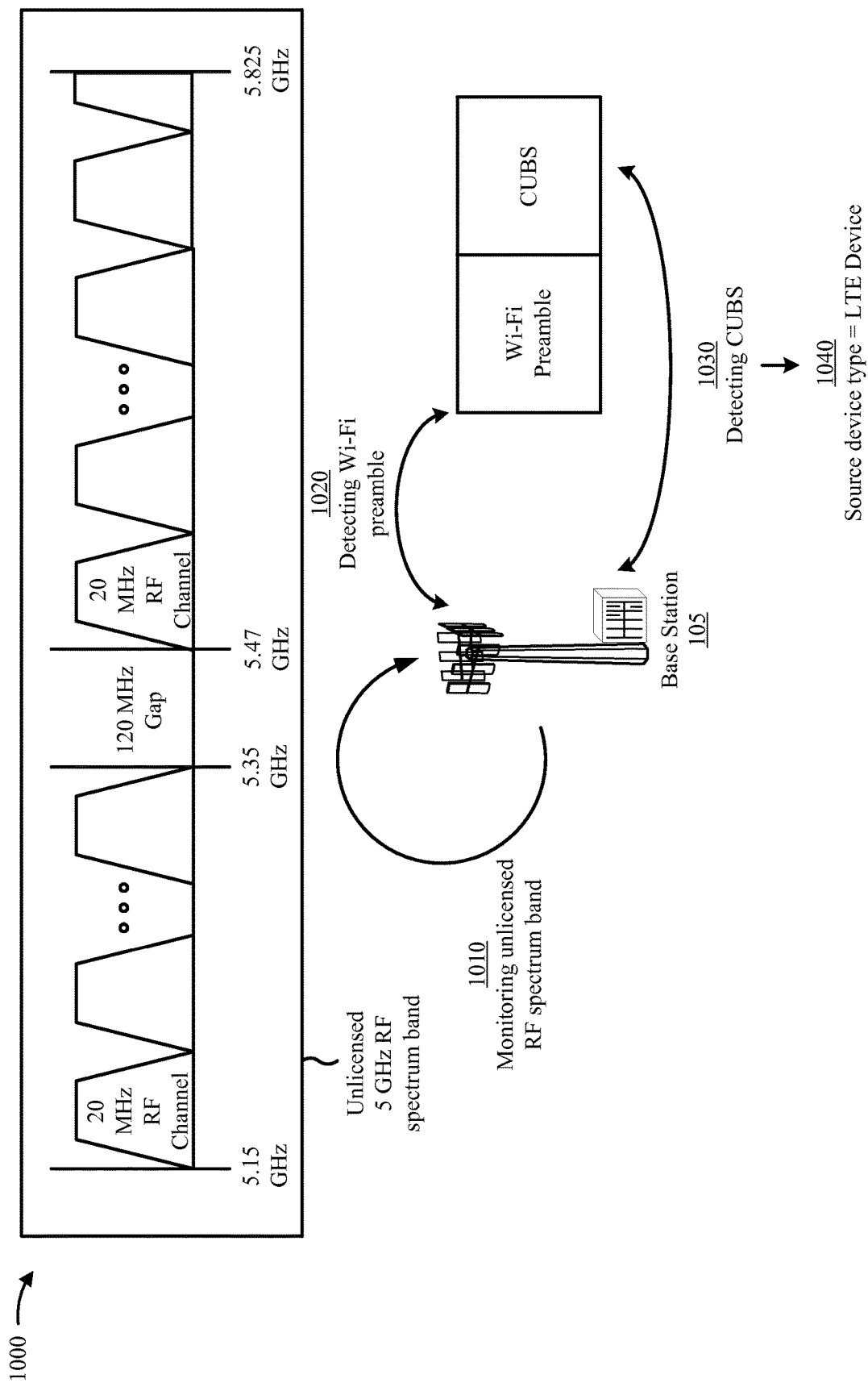
FIGS. 10A and 10B are illustrations of another example relating to the example process shown in FIG. 8, in accordance with various aspects of the present disclosure.
Figure 10B:
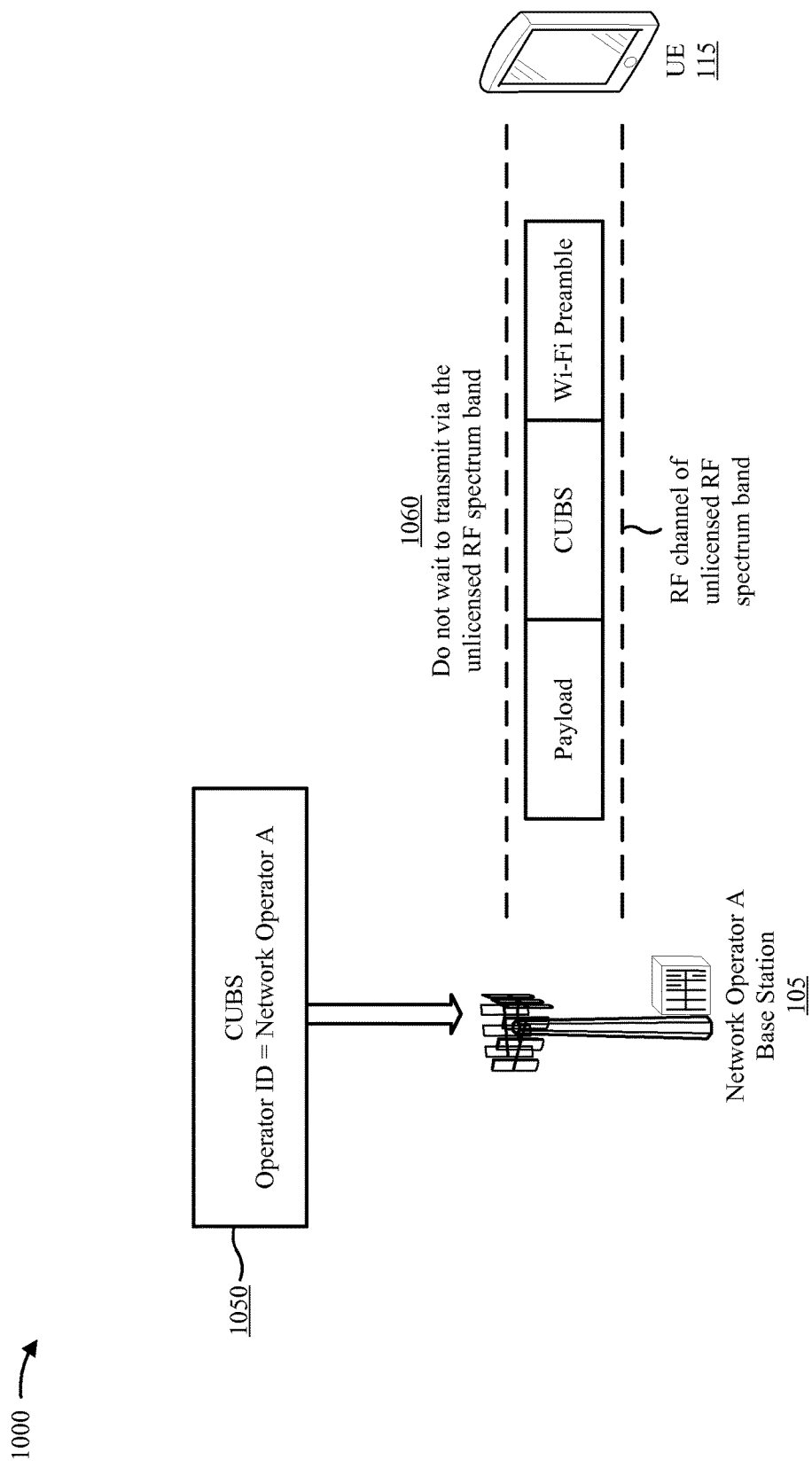

FIGS. 10A and 10B are illustrations of another example 1000 relating to example process 800 shown in FIG. 8, in accordance with various aspects of the present disclosure. FIGS. 10A and 10B show another example of selectively transmitting via the unlicensed RF spectrum band based on a detected first transmission indicator.

As shown in FIG. 10A, and by reference number 1010, assume that base station 105 monitors the unlicensed RF spectrum band (e.g., the unlicensed 5 GHz RF spectrum band). As shown by reference number 1020, assume that base station 105 detects a Wi-Fi preamble transmitted via the unlicensed RF spectrum band. As shown by reference number 1030, assume that base station 105 detects a CUBS that corresponds to the Wi-Fi preamble. In this case, base station 105 determines that the source device is an LTE device, as shown by reference number 1040.

As shown in FIG. 10B, and by reference number 1050, assume that the CUBS includes a network operator indicator that indicates that a source device, that transmitted the Wi-Fi preamble and the CUBS, is associated with "Network Operator A." Further, assume that base station 105 is also associated with Network Operator A. Based on the determining that the source device and base station 105 are associated with the same network operator (and/or based on determining that the source device is an LTE device), base station 105 does not wait to transmit a communication via the unlicensed RF spectrum band, as shown by reference number 1060. If the network operator associated with the source device had been a different network operator (e.g., "Network Operator B"), then base station 105 may have waited to transmit via the unlicensed RF spectrum band. In this way, base station 105 may assist in fair utilization of the unlicensed RF spectrum band by different network operators.

As indicated above, FIGS. 10A and 10B are provided merely as an example. Other examples are possible and may differ from what was described with regard to FIGS. 10A and 10B.

Aspects described herein assist in fair utilization of an unlicensed RF spectrum band by different types of devices (e.g., LTE devices, Wi-Fi access points, etc.), and between different network operators. By transmitting a first transmission indicator when using the unlicensed RF spectrum band, an LTE device (e.g., a UE, an eNodeB, etc.) may increase fairness of Wi-Fi access point access to the unlicensed RF spectrum band.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, and/or a combination of hardware and software.

Some aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that techniques, described herein, may be implemented in different forms of hardware, firmware, or a combination of hardware and software. The actual specialized control hardware or software code used to implement these techniques is not limiting of the aspects. Thus, the operation and behavior of the techniques were described herein without reference to specific software code-it being understood that software and hardware can be designed to implement the techniques based on the description herein.

Even though combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for wireless communication, comprising:
    determining, by a device, that an unlicensed radio frequency spectrum band is available for a communication;
    transmitting, by the device and based on determining that the unlicensed radio frequency spectrum band is available for the communication, a preamble that indicates that the device is transmitting information via the unlicensed radio frequency spectrum band,
    wherein the preamble is associated with a first radio access technology; and
    transmitting, by the device and based on determining that the unlicensed radio frequency spectrum band is available for the communication, a beacon signal that indicates that the device is transmitting the information via the unlicensed radio frequency spectrum band,
    wherein the beacon signal is associated with a second radio access technology that is different from the first radio access technology, and
    wherein the preamble and the beacon signal indicate the radio access technology that the device is using to transmit the information via the unlicensed radio frequency spectrum band.

2. The method of claim 1, wherein transmitting the preamble comprises:
    transmitting the preamble via the unlicensed radio frequency spectrum band; and
    wherein transmitting the beacon signal comprises:
    transmitting the beacon signal via the unlicensed radio frequency spectrum band.

3. The method of claim 1, wherein the preamble includes a Wi-Fi preamble;
    wherein the first radio access technology includes a Wi-Fi radio access technology;
    wherein the beacon signal includes a channel usage beacon symbol; and
    wherein the second radio access technology includes a long term evolution (LTE) radio access technology deployed in the unlicensed radio frequency spectrum band.

4. The method of claim 3, wherein transmitting the preamble and transmitting the beacon signal comprises:
including the Wi-Fi preamble and the channel usage beacon symbol in a communication structure,
the Wi-Fi preamble being included in a first field of the communication structure,
the channel usage beacon symbol being included in a second field of the communication structure,
the first field preceding the second field; and
transmitting the preamble and the beacon signal using the communication structure.

5. The method of claim 3, wherein transmitting the preamble and transmitting the beacon signal comprises:
including the Wi-Fi preamble and the channel usage beacon symbol in a communication structure,
the Wi-Fi preamble being included in a first field of the communication structure,
the channel usage beacon symbol being included in a second field of the communication structure,
the second field preceding the first field; and
transmitting the preamble and the beacon signal using the communication structure.

6. The method of claim 3, wherein transmitting the preamble and transmitting the beacon signal comprises:
including the Wi-Fi preamble and the channel usage beacon symbol in a same field of a communication structure; and
transmitting the preamble and the beacon signal using the communication structure.

7. The method of claim 1, wherein the preamble is embedded within the beacon signal.

8. The method of claim 1, wherein determining that the unlicensed radio frequency spectrum band is available for the communication comprises:
performing a clear channel assessment (CCA) procedure; and
determining that the unlicensed radio frequency spectrum band is available for the communication based on performing the CCA procedure.

9. The method of claim 1, wherein the device includes at least one of a base station or a user equipment.

10. The method of claim 1, wherein the preamble includes a Wi-Fi preamble; and
wherein the Wi-Fi preamble includes at least one of:
a source identifier that identifies the device, or
a radio access technology indicator that indicates that the device is capable of transmitting signals using a long term evolution (LTE) radio access technology deployed in the unlicensed radio frequency spectrum band.

11. The method of claim 1, further comprising:
determining a Wi-Fi protocol associated with a Wi-Fi access point within a communication range of the device; and
generating the preamble based on the Wi-Fi protocol.

12. The method of claim 1, wherein the preamble includes a Wi-Fi preamble;
wherein the Wi-Fi preamble includes a duration indicator that indicates a duration of the communication; and
wherein the beacon signal includes an indication that the preamble was transmitted.

13. An apparatus for wireless communication, comprising:
a processor;
memory in electronic communication with the processor; and
the processor and the memory configured to:
determine that an unlicensed radio frequency spectrum band is available for a communication;
transmit, based on determining that the unlicensed radio frequency spectrum band is available for the communication, a preamble that indicates that the device is transmitting information via the unlicensed radio frequency spectrum band,
wherein the preamble is associated with a first radio access technology; and
transmit, based on determining that the unlicensed radio frequency spectrum band is available for the communication, a beacon signal that indicates that the device is transmitting the information via the unlicensed radio frequency spectrum band,
wherein the beacon signal is associated with a second radio access technology that is different from the first radio access technology, and
wherein the preamble and the beacon signal indicate the radio access technology that the device is using to transmit the information via the unlicensed radio frequency spectrum band.

* * * * *